US006527638B1

(12) United States Patent
Walker et al.

(10) Patent No.: US 6,527,638 B1
(45) Date of Patent: Mar. 4, 2003

(54) SECURE IMPROVED REMOTE GAMING SYSTEM

(75) Inventors: Jay Walker, Ridgefield, CT (US); Bruce Schneier, Oak Park, IL (US)

(73) Assignee: Walker Digital, LLC, Stamford, CT (US)

(*) Notice: Subject to any disclaimer, the term of this patent is extended or adjusted under 35 U.S.C. 154(b) by 0 days.

(21) Appl. No.: 08/766,576

(22) Filed: Dec. 12, 1996

Related U.S. Application Data

(63) Continuation of application No. 08/406,224, filed on Mar. 16, 1995, now Pat. No. 5,580,549, which is a continuation-in-part of application No. 08/269,248, filed on Jun. 30, 1994, now abandoned, which is a continuation-in-part of application No. 08/212,348, filed on Mar. 11, 1994, now abandoned.

(51) Int. Cl.[7] ................................................ G06F 17/00
(52) U.S. Cl. .............................. 463/25; 463/40; 463/42
(58) Field of Search ................................ 364/410, 412; 380/3–4, 22–25; 463/25, 29, 40–42; 902/23

(56) References Cited

U.S. PATENT DOCUMENTS

| | | | | |
|---|---|---|---|---|
| 3,810,627 A | | 5/1974 | Levy | |
| 3,896,266 A | * | 7/1975 | Waterbury | 235/380 |
| 4,157,829 A | | 6/1979 | Goldman et al. | |
| 4,317,957 A | * | 3/1982 | Sendrow | 235/379 |
| 4,339,798 A | | 7/1982 | Hedges et al. | |
| 4,349,695 A | * | 9/1982 | Morgan et al. | 713/170 |
| 4,467,424 A | | 8/1984 | Hedges et al. | |
| 4,494,197 A | | 1/1985 | Troy et al. | |
| 4,587,379 A | * | 5/1986 | Masuda | 379/91.01 |
| 4,652,998 A | | 3/1987 | Koza et al. | |
| 4,689,742 A | | 8/1987 | Troy et al. | |
| 4,720,860 A | | 1/1988 | Weiss | |
| 4,760,527 A | | 7/1988 | Sidley | |

(List continued on next page.)

FOREIGN PATENT DOCUMENTS

| | | |
|---|---|---|
| EP | 0032410 | 7/1981 |
| EP | 0 032 410 A1 | 7/1981 |
| EP | 0 405 776 A2 | 1/1991 |
| EP | 0405776 A2 | 1/1991 |
| EP | 0450520 A2 | 9/1991 |
| EP | 0 450 520 A2 | 10/1991 |

(List continued on next page.)

OTHER PUBLICATIONS

Author Unknown, "Harrah's Reno Uses Hybrid ISDN to Attract Customers", Phillips Publishing, Inc., Mar. 1989, vol. 10, No. 3, ISSN: 0275–0686.

Author Unknown, "Agent Speaks Directly to the Customer on the Screen", Phillips Publishing, Inc., Mar. 1, 1989, vol. 2, No. 4, ISSN: 0899–9554.

(List continued on next page.)

*Primary Examiner*—Joe H. Cheng
*Assistant Examiner*—Julie Brocketti
(74) *Attorney, Agent, or Firm*—Dean P. Alderucci

(57) ABSTRACT

A remote gaming system whereby a player can gamble against a wagering establishment or state-run lottery from a remote location on a personal computer or portable computer device where it is unnecessary to establish an on-line connection with a host computer associated with the wagering establishment, the gaming computer having associated gaming software for providing at least one wagering opportunity and enabling the player to obtain gambling credit and cash-out any resulting winnings, the host computer enabling the player to purchase and redeem gambling credit at the remote location in one embodiment of the invention using cryptographic protocols such as through a series of authenticatable message exchanges between the player and the wagering establishment, the gaming computer and the host computer directly on-line, or the gaming computer having a detachable tamper-resistant or tamper-evident credit module associated therewith or for use with a personal computer being provided to the player with preinstalled or preloaded gambling credit, the gaming system also enabling participation in future events of which the outcome is uncertain such as, for example, a lottery whereby the player makes selections on a gaming computer at a remote location.

14 Claims, 33 Drawing Sheets

U.S. PATENT DOCUMENTS

| | | | | |
|---|---|---|---|---|
| 4,764,666 A | | 8/1988 | Bergeron | 235/380 |
| 4,856,787 A | | 8/1989 | Itkis | |
| 4,880,237 A | * | 11/1989 | Kishishita | 463/25 |
| 4,882,473 A | | 11/1989 | Bergeron et al. | |
| 4,922,522 A | | 5/1990 | Scanlon | |
| 4,982,337 A | | 1/1991 | Burr et al. | |
| 4,996,705 A | * | 2/1991 | Entenmann et al. | 463/17 |
| 5,038,022 A | * | 8/1991 | Lucero | 364/410 |
| 5,042,809 A | | 8/1991 | Richardson | |
| 5,083,271 A | * | 1/1992 | Thacher et al. | 364/11 |
| 5,083,272 A | * | 1/1992 | Walker et al. | 463/25 |
| 5,096,195 A | * | 3/1992 | Gimmon | 364/412 |
| 5,119,295 A | | 6/1992 | Kapur | |
| 5,177,342 A | | 1/1993 | Adams | 235/379 |
| 5,177,789 A | | 1/1993 | Covert | |
| 5,178,389 A | | 1/1993 | Bentley et al. | |
| 5,179,517 A | * | 1/1993 | Sarbin et al. | 364/410 |
| 5,181,238 A | | 1/1993 | Medamana et al. | |
| 5,197,094 A | * | 3/1993 | Tillery et al. | 463/25 |
| 5,210,795 A | | 5/1993 | Lipner et al. | |
| 5,214,697 A | | 5/1993 | Saito | |
| 5,216,712 A | | 6/1993 | Shimoda et al. | |
| 5,218,631 A | | 6/1993 | Katz | |
| 5,223,698 A | | 6/1993 | Kapur | |
| 5,235,166 A | | 8/1993 | Fernadez | |
| 5,239,583 A | | 8/1993 | Parrillo | |
| 5,241,600 A | | 8/1993 | Hillis | |
| 5,259,023 A | | 11/1993 | Katz | |
| 5,265,874 A | | 11/1993 | Dickenson et al. | |
| 5,276,312 A | | 1/1994 | McCarthy | |
| 5,277,424 A | | 1/1994 | Wilms | |
| 5,283,734 A | * | 2/1994 | Von Kohorn | 463/17 |
| 5,285,200 A | | 2/1994 | Kuriyama | |
| 5,289,542 A | | 2/1994 | Kessler | |
| 5,313,520 A | | 5/1994 | Han | 380/4 |
| 5,313,637 A | | 5/1994 | Rose | |
| 5,315,624 A | | 5/1994 | Tanaka et al. | |
| 5,315,634 A | | 5/1994 | Tanaka et al. | |
| 5,317,135 A | | 5/1994 | Finocchio | |
| 5,324,035 A | * | 6/1994 | Morris et al. | 463/42 |
| 5,326,104 A | | 7/1994 | Pease et al. | |
| 5,327,485 A | | 7/1994 | Leaden | |
| 5,351,970 A | * | 10/1994 | Fioretti | 273/439 |
| 5,371,345 A | * | 12/1994 | LeStrange et al. | 235/380 |
| 5,380,007 A | * | 1/1995 | Travis et al. | 273/138 A |
| 5,413,357 A | * | 5/1995 | Schulze et al. | 273/436 |
| 5,429,361 A | * | 7/1995 | Raven et al. | 273/138 A |
| 5,457,306 A | * | 10/1995 | Lucero | 235/380 |
| 5,508,731 A | | 4/1996 | Kohorn | |
| 5,557,086 A | * | 9/1996 | Shulze et al. | 235/380 |
| 5,709,603 A | | 1/1998 | Kaye | 463/17 |

FOREIGN PATENT DOCUMENTS

| | | | |
|---|---|---|---|
| EP | 0 478 412 | A1 | 4/1992 |
| EP | 0478412 | A1 | 4/1992 |
| EP | 0 487 446 | A2 | 5/1992 |
| EP | 0487446 | A2 | 5/1992 |
| EP | 2 697 653 | | 5/1994 |
| FR | 2697653 | | 5/1994 |
| GB | 2 121 569 | A | 12/1983 |
| GB | 2121569 | A | 12/1983 |
| JP | 01258178 | | 1/1990 |
| JP | 01269158 | | 1/1990 |
| JP | 01269164 | | 1/1990 |
| JP | 01316869 | | 3/1990 |
| JP | 02110660 | | 7/1990 |
| JP | 03269763 | | 2/1992 |
| JP | 0635944 | | 5/1994 |
| JP | 06035944 | | 5/1994 |
| SE | 500436 | | 6/1994 |
| WO | WO8602752 | | 5/1986 |
| WO | WO/8602752 | | 5/1986 |
| WO | WO 92/10806 | | 6/1992 |
| WO | WO9210806 | | 6/1992 |
| WO | WO 92/16914 | | 10/1992 |
| WO | WO9216914 | | 10/1992 |
| WO | WO9319428 | | 9/1993 |
| WO | WO 93/19428 | | 9/1993 |
| WO | WO9419906 | | 9/1994 |
| WO | WO 94/19906 | | 9/1994 |
| WO | WO9505876 | | 3/1995 |
| WO | WO 95/05876 | | 3/1995 |
| WO | WO 95/24689 | | 9/1995 |

OTHER PUBLICATIONS

Conniff, Michael, "Don't Bet Against Harrah's When it Comes to ISDN", Link Resources Corp., May 1, 1989, vol. 2, No. 5.

Bos, Richard, "AILE, Space–age Gaming in Switzerland via Interactive Videotex", Gaming & Wagering Business, May 5, 1994.

Author Unknown, "Games of Chance Worldwide", Communications Daily, Nov. 30, 1994, vol. 14, No. 230, ISSN: 0277–0679.

Author Unknown, "Interactive Network Sets Up Gaming Subsidiary", SCTT Marketing Inc., Dec. 1994, vol. 1, No. 25.

Author Unknown, "Interactive Network Launches Wagering Unit", Multimedia Business Report, Dec. 2, 1994, ISSN: 1065–8300.

Author Unknown, "Interactive Network Forms Real–Time Gambling Subsidiary", Newsbyte News Network, Dec. 7, 1994.

Dvorak, John C., "Gambling on a PC Near You" (worldwide gambling interests will invade the Internet, bulletin boards), PC Magazine, May 16, 1995, vol. 14, N9 at p. 89(1), ISSN: 0888–8507.

Popular Mechanics, The Magic Box, Frank Vizard, pp. 39–41, Apr. 1994.

Science & Society, Decoding the Electronic Future, Vic Sussman, pp. 69, 71 U.S. News & World Report, Mar. 14, 1994.

Intelligent Games—Casino Games, Advertisement, Pro Draw Poker, p. 26, 27.

Advertisement, Tiger Electronics Inc., Caesars Palace Talking Casino Games.

Worth, High Stakes, Author Unknown, p. 20, Feb. 1994.

How The Mag Stipe Could Cut Fraud, Author unknown, p. 73; Feb. 1994.

Gaming & Wagering business, Paul Doocey, Interactive Technology Drives Down The Home Stretch, pp. 12–13, Feb. 5, 1994.

Gaming Wagering Business, Matt Connor, The Latest Gaming Frontier? The Sky's The Limit pp. 4–5 Dec. 14, 1993.

Gaming Wagering Business, North American Gaming At A Glance, Author unknown Nov. 15, 1993–Dec. 14, 1993 p. 6.

Gaming & Wagering Business, Lotteries, Patricia A. McQueen, p. 32, 34 Oct. 15–Nov. 14, 1993.

Gaming & Wagering Business, Paul Doocey, The Gaming Industry Celebrates The Birth Of The New Machine Age pp. 36, 38, 40 Oct. 15, 1993.

Gaming & Wagering Business, Harrah's Survey of U.S. Casino Gaming Entertainment Reveals Gamblers Like The Interactive Nature of Casino Gaming, John Boushy, p. 8, 10, 13, 61 May 13–Jun. 14, 1994.
Gaming & Wagering Business, Harold A. Layer, Racing, Video Terminals And The Home Computer p. 46 Mar. 15, 1993.
Advertisement, undated Radica Casino Slot.
Advertisement, undated Saitek Pro Blackjack.
Science & Technology, Games People Play Over Phone Lines, Author Unknown, p. 69 Business Weekly Feb. 28, 1994.
WholeEarth Review, In Tim May's Eyes, Kevin Kelly, pp. 40–59, Summer 1993.
Foiling Card Forgers With Magetic 'Noise', Author Unknown.
Washington Post, "LottoFone Seeks Sales Pact With Lottery Panel", Michelle Singletary, Nov. 8, 1993.
English Translation of Abstract of SE 500436.
John C. Dvorak, Gambling on a PC Near You, PC Magazine, v14, n9, p. 89 May 16, 1995.
Newsbyte News Network, Interactive Network Forms Real–Time Gambling Subsidiary Dec. 7, 1994.
SCTT Marketing Inc. Interactive Network Sets Up Gaming Subsidiary V. 1, No. 25; 12/94.
Interactive Network Interactive Network Launches Wagering Unit, Multimedia Bus. Rpt.Dec. 02, 1994.
Warren Publishing, Inc. Games of Chance Worldwide, V. 14 No. 230, Nov. 30, 1994.
Michael Conniff Don't Bet Against Harrah's When it Comes to ISDN May 1, 1989 V.2 No. 5.
Phillips Publishing, Inc. Agent Speaks Directly to the Customer on the Screen v.2 No. 4 Mar. 1, 1989.
Phillips Publishing, Inc. Harrah's Reno Uses Hybrid ISDN to Attract Customers V. 10 No. 3 3/89.

* cited by examiner

SECURE IMPROVED REMOTE GAMING SYSTEM

This Application is a Continuation of now a U.S. patent application Ser. No. 08/406,224, now U.S. Pat. No. 5,580,549 entitled "SECURE IMPROVED REMOTE GAMING SYSTEM", filed on Mar. 16, 1995; which is a Continuation-In-Part of now abandoned U.S. patent application Ser. No. 08/269,248, now abandoned filed on Jun. 30, 1994; which is a Continuation-In-Part of now abandoned U.S. patent application Ser. No. 08/212,348, filed on Mar. 11, 1994.

BACKGROUND

1. Field of the Invention

The present invention relates generally to a remote gaming system, and more particularly, to a remote gaming system by which a player can wager on a plurality of games of chance and/or future public events of which the outcome is uncertain, offered by a casino, government lottery organization, or other wagering establishment.

2. Description of the Prior Art

In the past, a player wishing to wager on a game of chance such as those offered in a casino or on a public event of which the outcome is uncertain such as sporting events, had a limited number of options. In order to wager on casino games such as roulette, blackjack, poker and the like, the player had to physically travel to a gaming establishment specifically engaged in such activities or to a location where stand-alone gambling devices such as video poker terminals or slot machines were available. Although public events such as horse races may be wagered on by telephone contact with an authorized "off-track betting" gaming-establishment or its agent, such methods utilizing telephone contact have not been amenable to typical casino games.

As a result of advances in computer technology and telecommunications, remote gaming systems have been devised in which a player can participate in a plurality of games of chance being offered by a gambling establishment without having to be physically located on the premises. An example is found in U.S. Pat. Nos. 4,339,798 and 4,467,424, both to Hedges et al. The Hedges Patents disclose a remote gaming system wherein a player proceeds to gamble against the casino at a remote player station which includes a live game display to permit the player to engage in actual games of chance as they are being played in real-time at a croupier station comprised of one or more gaming tables in the casino. The player station includes a changeable keyboard communicating with a microprocessor for displaying a selected one of a plurality of wagering possibilities corresponding to a selected one of the plurality of games being played and for displaying the results of the game being played. The player becomes part of the game as if he or she were actually present at the gaming table in the casino. To provide a secure communications link, the remote gaming station communicates with the croupier station and a credit control station through an encryption/decryption device to prevent tampering by unauthorized sources.

While such a system provides a means by which a player can gamble from a remote location, its primary disadvantage resides in the fact that the player can gamble only by participating in games being actually conducted in the gaming establishment and monitored over real-time closed circuit video. Moreover, such a system has limited practicality since the player can only gamble on a specialized gaming station which must be electronically linked to the casino. It would therefore be highly desirable to provide a remote gaming system by which a player could engage in gambling on a gaming computer at a remote location at the player's convenience where the casino provides for the purchase and redemption of casino credit, notwithstanding the absence of any direct electronic communication link between the gaming computer and the casino.

SUMMARY OF THE INVENTION

Accordingly, it is an object of the present invention to provide a remote gaming system by which the player can wager on any one of a plurality of games of chance typically offered by a wagering establishment (e.g., a casino or whatever entity is offering to bet against the player) at the player's convenience.

It is another object of the present invention to provide a remote gaming system by which the player can wager against the wagering establishment on any one of a plurality of wagering opportunities such as games of chance generated by computer software installed or loaded on any personal computer.

It is a further object of the invention to provide a remote gaming system by which a player can wager against the wagering establishment on a conventional multi-media apparatus (e.g., a NINTENDO apparatus coupled to a television set) through compatible plug-in data storage media.

It is yet another object of the invention to provide a remote gaming system by which a player can purchase and redeem wagering credit from remote locations without the need for an on-line electronic communications link to be established between the player's gaming computer and the wagering establishment, It is still another object of the invention to provide a remote gaming system by which a player can wager on any one of a plurality of games of chance generated by software installed or loaded on a dedicated gaming computer, including a hand-held portable device, which can be provided to the player, yet need not be electronically linked on-line to the wagering establishment for purposes of gambling, purchasing and redeeming gambling credit.

It is yet another object of the invention to provide a remote gaming system wherein authenticatable messages communicated between, read and authenticated by a remote gaming computer, including a dedicated machine for wagering, a general-purpose game machine, a personal computer or personal digital assistant (PDA), or any other device for computing and communicating with the house or wagering establishment, and a host computer associated with the wagering establishment, either on-line (including wireless electronic communication hardware) or off-line (orally with an agent or electronic communications over the telephone, but where no connection is necessary between the gaming computer and the wagering establishment), prevent unauthorized users from gaining access to or fraudulently obtaining or redeeming gambling credit.

It is another object of the present invention to provide a remote gaming system in which a gaming computer and/or host computer associated with the wagering establishment restricts access to wagering opportunities by means of hardware or software for authenticating a personal identification number (PIN) or passphrase.

It is still another object of the present invention to provide a remote gaming system in which a gaming computer and/or host computer associated with the wagering establishment restricts access to wagering opportunities, using authentication from some external credit card, smart card, funds transfer system, digital cash system, or other payment system.

It is yet another object of the invention to provide a remote gaming system in which a gaming computer and/or host computer associated with the wagering establishment restricts access to wagering opportunities utilizing biometrics including, but not limited to, fingerprints, voiceprints, retinal-prints and the like.

It is still another object of the invention to provide a remote gaming system in which a gaming computer and/or host computer associated with the wagering establishment restricts access to wagering opportunities using a physical access token or physical key.

It is a further object of the invention to provide a remote gaming system in which a gaming computer and/or a host computer associated with the wagering establishment restricts access to wagering opportunities using authorization transferred from a remote system, whether or not that system is working as an agent or provider of the wagering opportunities.

It is another object of the invention to provide a remote gaming system in which a gaming computer and/or host computer associated with the wagering establishment, in addition to or in lieu of other security measures, restricts access to wagering opportunities by consulting an internal or external database having stored lists of banned and/or valid identification codes, including but not limited to EFT account numbers, user IDs, credit card account numbers, and the like.

It is a further object of the present invention to provide a remote gaming system which is made secure by incorporating cryptographic protocols or methods such as digital signatures, one-way hashes, zero-knowledge proofs, encryption, message-authentication codes, bit-commitment protocols and the like.

It is a further object of the present invention to provide a remote gaming system which is made secure by utilizing internal checksums and audit sums.

It is another object of the invention to provide a remote gaming system which is made secure by using hardened "agents" of the "house", i.e., the wagering establishment, in the form of software and/or hardware devices, humans, or any or all of these, in a remote or nearby location, or installed in or on a remote gaming computer.

It is still another object of the invention to provide a remote gaming system which is made secure by utilizing digital time stamping to generate authenticatable messages to be read and authenticated by a host computer associated with the wagering establishment for verification.

It is a further object of the invention to provide a remote gaming system which is made secure by incorporating secure timers, counters, running hashes or checksums, digital signatures, or other hidden values to frustrate attempts to defraud or tamper with the gaming software of data storage media associated with the gaming computer.

It is yet another object of the invention to provide a remote gaming system which is made secure by employing batch communications between the gaming computer and the wagering establishment.

It is still another object of the invention to provide a remote gaming system in which a player receives a tamper-resistant or tamper-evident read/write device from the wagering establishment containing data storage media for dedicated gaming software which can be linked to or installed on any personal computer, yet is inspectable by the wagering establishment to prevent unauthorized manipulation of, or alteration to, the software.

It is still another object of the invention to provide a remote gaming system in which the gaming and/or banking software is embodied in data storage media such as, for example, a computer disk, where the unique magnetic signature of that disk is readable by the gaming computer as an authenticatable message for authentication by the gaming computer and/or the wagering establishment host computer to make unauthorized duplication of the disk or alteration to data on the disk detectable by the wagering establishment.

It is still another object of the invention to provide a remote gaming system by which a player can wager on future public or external events of which the outcome is uncertain such as a lottery, either through an on-line connection between a gaming computer and the wagering establishment, or off-line where the player's wager is time-stamped to generate an authenticatable message, representing the player's choice of wagering elements (i.e., numbers) for a given lottery event (occurring at some time in the future) and, including, at least one of a date/time stamp or authenticated time message, player's identification code, and computer/software identification code.

It is yet another object of the invention to provide a remote gaming system by which a player can obtain and redeem wagering credit from the wagering establishment embodied in tamper-resistant or tamper-evident data memory media which interface with a remote gaming computer.

It is still another object of the invention to provide a remote gaming system by which a completely self-contained, dedicated gambling personal digital assistant may be obtained with a preprogrammed and/or predetermined amount of non-renewable credit embodied in gaming software installed on or loadable into the digital assistant.

It is a further object of the invention to provide a remote gaming system by which a player can engage in a game of skill (e.g., a crossword puzzle) residing in software installed on a dedicated gambling personal digital assistant having a preprogrammed and/or predetermined amount of non-renewable gambling credit.

It is yet another object of the invention to provide a remote gaming system in which winnings and collection on losses may be authorized by means of a digital cash protocol.

It is a further object of the invention to provide a remote gaming system in which payment of winnings and collection on losses is authorized by means of an electronic funds transfer mechanism.

It is still another object of the invention to provide a remote gaming system in which payment of winnings and collection on losses is authorized by means of a credit card authorization mechanism.

It is yet another object of the invention to provide a remote gaming system in which payment of winnings and collection on losses is authorized through the wagering establishment or its agents through communication between a remote gaming computer and a host computer associated with the wagering establishment.

It is still another object of the invention to provide a remote gaming system in which winnings and collection on losses are paid directly in currency form.

It is a further object of the invention to provide a remote gaming system in which all gambling credit is loaded into a gaming computer by the wagering establishment or its agent(s) prior to providing the player with the gaming computer.

It is still another object of the invention to provide a remote gaming system in which a premium application enables a player who purchases a product such as a computer, or software on data storage media, to win something as determined by the output of a gaming program embedded within such product.

It is yet another object of the invention to provide a remote gaming system by which a player wagering at a remote location is subject to predetermined limitations on winnings by a wagering establishment.

In accordance with the above objects and other objects which will become apparent hereinafter, the present invention provides a remote gaming system which enables a player to gamble against a wagering establishment using a gaming computer at a remote location. The gaming computer may or may not be electronically linked, i.e., "on-line", to a host computer associated with the wagering establishment while gambling takes place. The term "wagering establishment" as used herein is intended to include authorized agents or other parties which act on behalf of the wagering establishment to implement the gaming process. The term "host computer" includes a single device, multiple devices and/or computer networks and systems. The gaming computer can be any personal computer, hand-held computer device (e.g., a personal digital assistant), or multimedia apparatus which functions as the gaming computer (e.g., a NINTENDO or like apparatus), and may or may not be a dedicated gambling computer provided by the wagering establishment. If provided by the wagering establishment, the gaming computer can be preloaded with gaming software. If the gaming computer is a conventional personal computer, the gaming software is either preinstalled on a secure data storage media device, e.g. a hard disk, CD-ROM, etc., or module provided by the wagering establishment, or installed directly on the gaming computer by the player.

The gaming software includes a game program and a banking program. The game program generates a plurality of games of chance typically offered by the wagering establishment, e.g., blackjack, roulette, craps, poker, slots, etc., games of skill or makes available wagering on external events or future public events of which the outcome is uncertain, e.g., a lottery. The banking program provides for the purchase or loading of gambling credit into a banking file from the wagering establishment to enable gambling, and increments or decrements the player's account balance to enable the player to cash-out any gambling winnings. The term "gambling credit" as used herein, means purchased credit, accumulated gambling winnings, collection on losses and the like. The gaming software may also include an audit program which records the outcome of each wager and the data communicated between the player and the wagering establishment as read, authenticated and/or generated by the gaming computer in order to effect gambling, and the purchase and redemption of gambling credit.

The wagering establishment has a host computer with software containing a banking program which enables players to purchase, accumulate and redeem gambling credit at remote locations, even if no on-line communications exist with the gaming computer, and an audit program for recording such transactions. This may be accomplished, in one preferred embodiment of the invention, by communicating a plurality of authenticatable messages between the gaming computer and the host computer, which messages are respectively read and authenticated by each device, either through oral communications between the player and the wagering establishment, e.g., such as via an automated public telephone network having interactive voice capabilities using a touch-tone phone. The words "authenticatable", and "authenticate" as disclosed and claimed herein include cryptographic protocols such as encryption and decryption, digital signatures, one-way hashes, checksums and the like. The utilization of authenticatable messages is one way to prevent a third party or a verified player from gaining unauthorized access to the system and then attempting to fraudulently obtain or redeem gambling credit and/or tamper with the game program to produce altered wagering opportunities having only a favorable outcome. Alternatively, gambling credit can be "built-in" or preinstalled on a tamper-evident or tamper-resistant module for installation on a conventional personal computer, or pre-installed on a dedicated gaming computer provided by the wagering establishment. In the off-line embodiment, the automated public telephone network or "agent" is associated with the host computer of the wagering establishment, but it is not necessary to have a direct electronic on-line connection between the gaming computer and the host computer.

If the gaming computer is networked to the host computer, the connection may or may not serve to regulate or control the simulation of casino games on the gaming computer by the gaming software. For example, the connection may serve to have the host computer keep a record or audit-trail of all or selected activities taking place at the gaming computer for purposes of additional verification or security. Alternatively, the connection may be of a controlled nature to vary the odds of a given wager based upon any of a variety of factors such as gambling duration or a progressively increasing jackpot (e.g., in a slot machine simulation). In such an on-line embodiment, security and player verification can be obtained by utilizing a stand-alone secure message generation and authentication device, such as, for example, an encryption/decryption unit of the type commonly employed in making wireless money transfers. This device generates an authenticatable verification code based upon the user's personal identification code and possibly a second code provided to the user from the host computer or stored in the stand-alone authentication device to prevent an unauthorized user from obtaining on-line access upon having stolen a user's personal identification code.

At all times, each wager by the player generates an electronic audit-trail on the gaming computer, the host computer and/or on any networked computers by recording the amount of each wager, the outcome of each gambling event and any resulting gambling earnings or losses, in an authenticatable message or a series of messages which are read and authenticated by the host computer and/or the gaming computer. The financial resolution of each wager is cumulatively tracked by the software on the gaming computer and perhaps also on any networked computers, so that the player is able to constantly monitor his or her gambling credit balance with the wagering establishment.

A player gambles in substantially the same way he or she does in a casino. The player chooses which games to play as presented by the gaming software, the amount of each wager and the length of time each game is played. The player may remain active over several different gaming sessions which may take place at several different times and/or places. The player may at any time place wagers which are for practice only which do not affect the player's gambling credit balance. As an option, the player's gambling credit balance may be transferred and stored on data storage media which can be installed on other computers where software has been, or can be, installed to recognize the player's gambling credit balance. The player may then continue to wager on any of such other computers. Whenever the player wishes to cash-out his or her gambling credit, redemption from the wagering establishment may be implemented by contacting the wagering establishment by telephone in an "off-line" embodiment, either through an automated telephone network with voice capabilities, or a live agent, or by communicating on-line in an "on-line" embodiment. In one embodiment described above, when the player desires to cash out, a series of authenticatable messages are exchanged with the host computer, such as orally through an automated telephone network, or are transmitted electronically on-line by conventional means in the on-line embodiment. In the off-line embodiment, these authenticatable messages are generated by the gaming computer software and the host computer software, and communicated between and read by the gaming computer and host computer for authentication to verify the player's identity and authenticity of the player's gambling credit account prior to cashing-out gambling credit. In the on-line embodiment, a stand-alone device or software associated with the gaming computer generates an authenticatable log-on or confirmation message for verification by the host computer. Alternatively, where the gaming computer itself, e.g., a personal digital assistant, is provided to the player by the wagering establishment, it or a tamper-resistant or tamper-evident plug-in module may be physically returned to the wagering establishment for credit redemption. The module includes data-storage media preferably disposed in an inspectable tamper-resistant or tamper-evident casing which can be examined by the wagering establishment for any indication of tampering. Such gambling credit can be redeemed from the wagering establishment in any of a variety of forms of payment including, but not limited to, cash, bank-wire transfers, credits or some other form of payment mutually agreed to by the player and the wagering establishment.

DETAILED DESCRIPTION OF THE PREFERRED EMBODIMENT

Figure 1A:
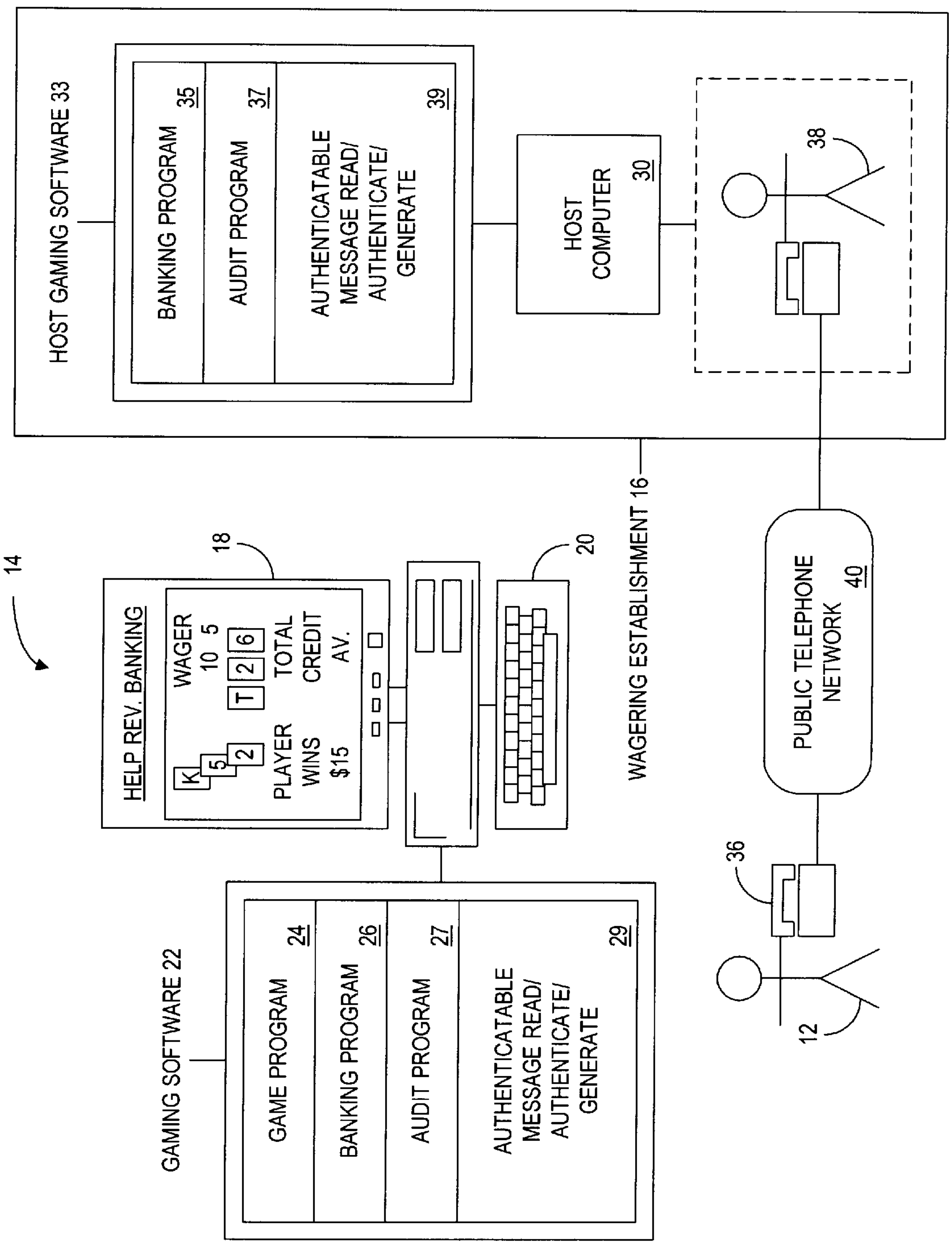
FIG. 1A is a schematic view of the remote gaming system in a first off-line embodiment.

With reference to the several views of the drawings, there is depicted a remote gaming system generally characterized by the reference numeral 10 by which a player 12 with access to a computer 14 ("the gaming computer") wagers on a plurality of games of chance, or on future public events where the outcome of such events is uncertain, offered by a casino, government lottery organization or other wagering establishment 16. For convenience, these and any authorized agent thereof will be generally referred to hereinafter as "the wagering establishment."

Figure 3:
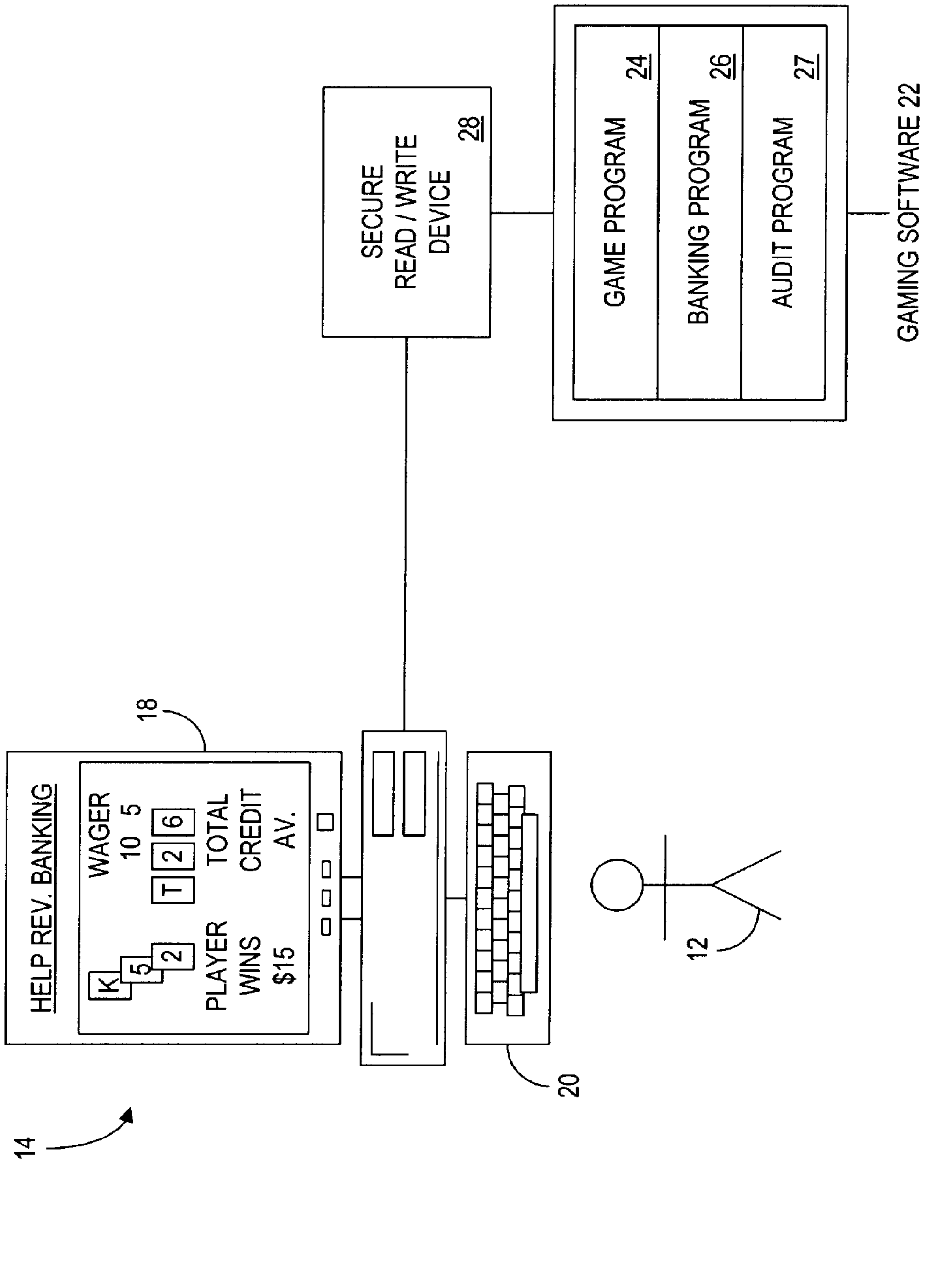
FIG. 3 is a schematic view of a gaming computer connected to a tamper-resistant or tamper-evident read/write data storage media device provided by the wagering establishment.

Referring now to FIG. 1A, the player 12 has access to gaming computer 14 having a video display 18 and a keyboard 20. The gaming computer 14 can be a personal home computer, lap-top, or hand-held personal digital assistant device, which may or may not be a dedicated gaming apparatus provided by wagering establishment 16, or may be a multi-media apparatus, e.g., a NINTENDO or similar device for use with a television or the like. The gaming computer 14 can be located at the wagering establishment 16 or some other establishment, e.g., a lottery ticket vendor, or off-site at a remote location. A gaming computer 14 which is located at the wagering establishment 16 can still be classified as "remote" in the context of the invention claimed herein. In this regard, it is anticipated that a casino could provide players, in for example the hotel where the casino is located, with a dedicated gaming computer 14 which could be used to gamble either within or outside of the physical boundaries of the casino. A primary advantage of providing the player 12 with a wagering establishment-furnished gaming computer 14 is greater security, specifically with regard to making unauthorized access to the data storage media such as a computer disk drive or module more difficult. Moreover, in a dedicated gaming computer, the keyboard 20 can be customized with specialized function keys identifying commands, e.g., keys dedicated to blackjack might have indicia stating "hit me", "stand", "purchase insurance", etc., which the player selects to proceed to gamble on the various games of chance, games of skill or future events of which the outcome is uncertain, offered by the wagering establishment 16. Gaming computer 14 operates special gaming software 22 comprised of a game program 24, a banking program 26 and optionally, an audit program 27. Gaming software 22 can be preinstalled on a dedicated gaming computer 14 provided by the wagering establishment 16, preinstalled in an external tamper-resistant or tamper-evident read/write data storage media apparatus 28 provided by wagering establishment 16 which interfaces with a personal computer functioning as the gaming computer 14 as shown in FIG. 3, or installed directly on the personal computer by the player 12. Furthermore, the gaming software 22 may be made available to the player 12 in a tamper-resistant or tamper-evident plug-in module for use with a conventional personal computer or multi-media apparatus which functions as the gaming computer 14, to be described in more detail hereinbelow.

Figure 2:
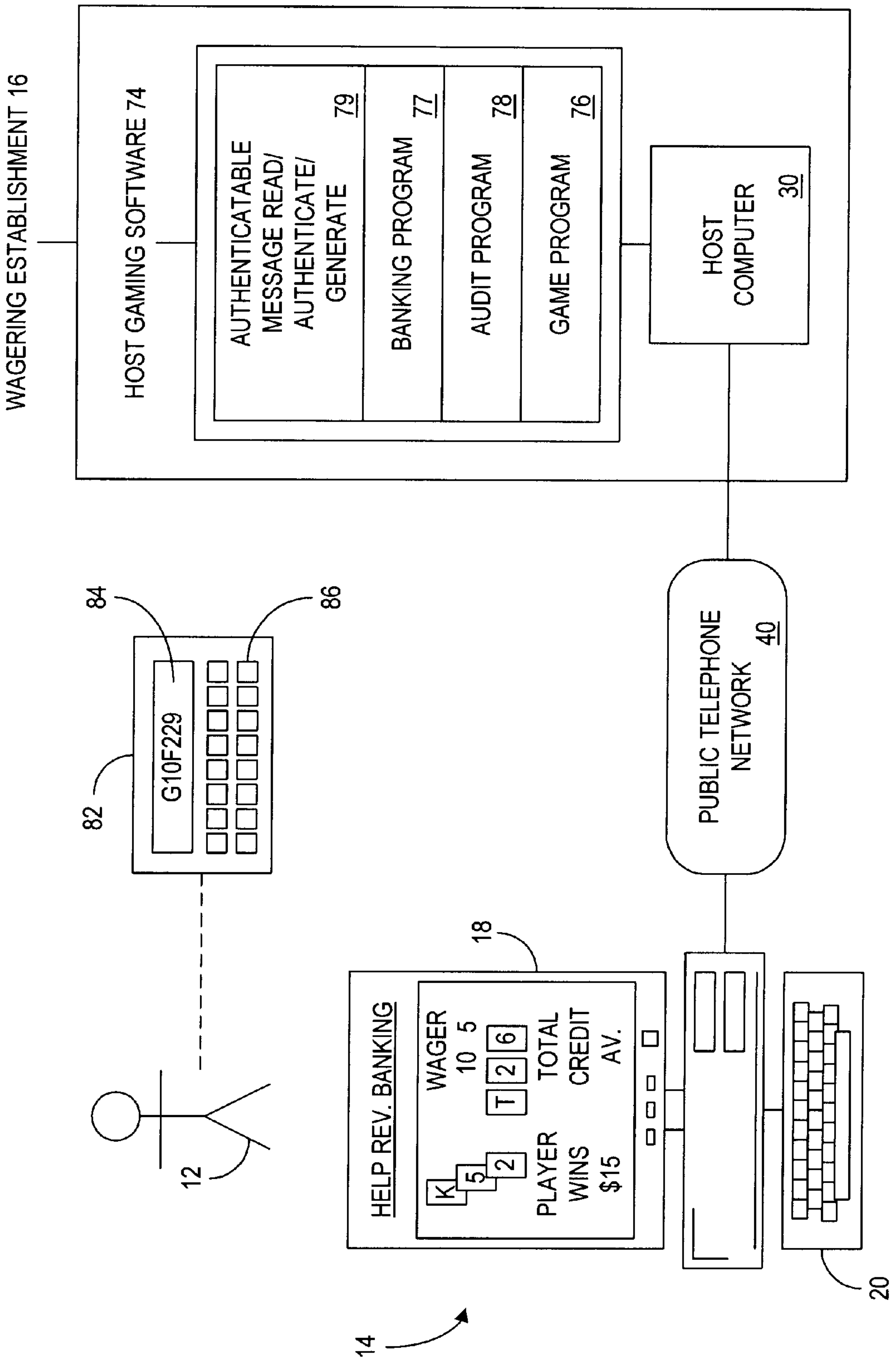
FIG. 2 is a schematic view of the remote gaming system in an on-line embodiment.

It is critical that the wagering establishment 16 be able to determine if the software itself or data associated therewith was copied, tampered with or in any way altered, otherwise an unscrupulous player 12 could make a plurality of copies and keep playing with identical disks until such time that one of the copied disks produced a favorable outcome, or the player 12 could alter the software itself in an attempt to control the outcome, the winnings or losses, or a combination thereof, i.e., a dishonest player 12 modifies the software code of the gaming software 22 in such a way as to make the software generate a winning outcome more frequently than chance would dictate (e.g., in a roulette simulation, causing the roulette wheel to land on a more favorable number more frequently). This could be achieved by replacing the software in its entirety or by modifying certain code lines or software instructions of the program, either physically or by some other externally applied influence such as high-intensity electromagnetic radiation, e.g., an RF field of course, the most secure system is an on-line arrangement where the gaming software 74 resides in a host computer 30 associated with and/or on the premises of the wagering establishment (FIG. 2). The most difficult security issues with regard to tampering arise in embodiments where the wagering establishment 16 provides the player 12 with software for use on a remotely disposed gaming computer 14 or with a dedicated gaming computer 14 itself (e.g., a PDA). In this connection, the present invention provides a variety of means for ensuring that system security and integrity are not compromised.

In one application, software can be provided which instructs the gaming computer 14 to read the unique magnetic characteristics, i.e., "fingerprint", of the specific disk or data storage media on which gaming software 22 is made available for installation, for the purpose of creating a unique authenticatable message to be read and authenticated by the wagering establishment 16 to reveal to the wagering establishment 16 any unauthorized duplication of, or tampering with, data on that disk or data storage media. Alternatively, a plug-in device can interface with the gaming computer disk drive to read a portion of the disk to acquire the unique magnetic characteristics of the disk, or the wagering establishment 16 can utilize the same hardware and/or software to obtain this magnetic signature and keep this information on file for use at some future time should tampering be suspected, or as a prerequisite to authorizing any gambling functions to a specific player 12, e.g., this data can be registered with or required by the wagering establishment 16 prior to allowing the player 12 to cash-out any gambling winnings.

Figure 13:
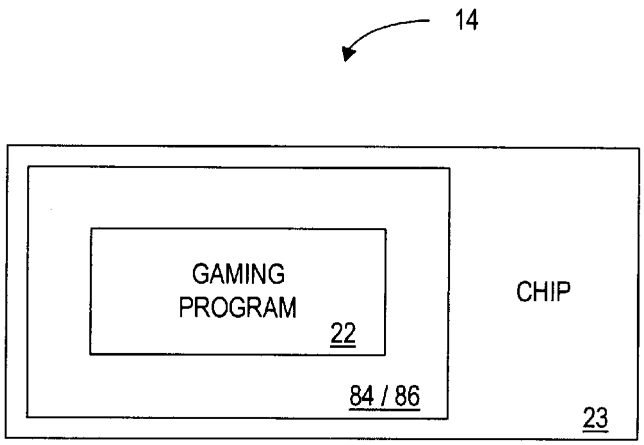
FIG. 13 is a schematic of a memory chip made secure by an external tamper-resistant or tamper-evident structure.

In another embodiment shown schematically in FIG. 13, the gaming software 22 resides on a tamper-resistant or tamper-evident chip 23 disposed within or otherwise associated with the gaming computer 14, i.e., where a dedicated device is provided by the wagering establishment 16, or otherwise connected to the gaming computer 14, e.g., a secure, external disk drive connected to a conventional personal computer. The chip 23 can be situated within a physical casing 84 which is isolated and unaccessible from any external data port connection. In an exemplary embodiment, the chip 23 can be housed within special seals, insulation, wrapping, or the like 86, which can be inspected by the wagering establishment 16 to reveal whether any authorized attempts were made to remove, alter or otherwise tamper with the chip 23. Thus, the wagering establishment 16 can readily ascertain if the player tampered with the gaming software and, if such tampering is discovered, it can deny such player any claimed winnings and/or future gambling credit.

Figure 14:
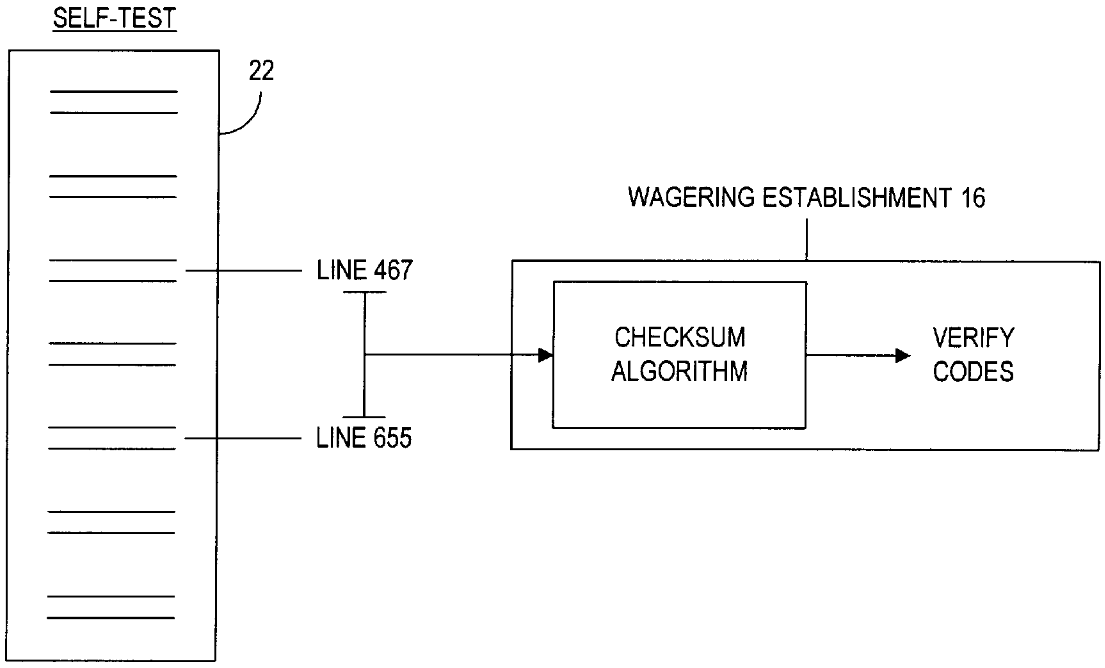
FIG. 14 is a schematic of a first means for verifying the integrity of the gaming software.

In yet another embodiment shown schematically in FIG. 14, unique mathematical attributes can be derived from certain characteristics of the software code in a self-test process. To perform such a test, the characteristics of the code are kept secret and are known only to the wagering establishment 16 by using checksums, one-way hashes and other cryptographic protocols, including, for example, a check-digit type algorithm based upon the sum of the bits located in certain parts of the program, for example, lines 476 through 655 of the code as shown. Alternatively, the self-test can verify special codes which are embedded within the software or code instructions in some predetermined random manner known only to the wagering establishment 16.

Figure 15A:
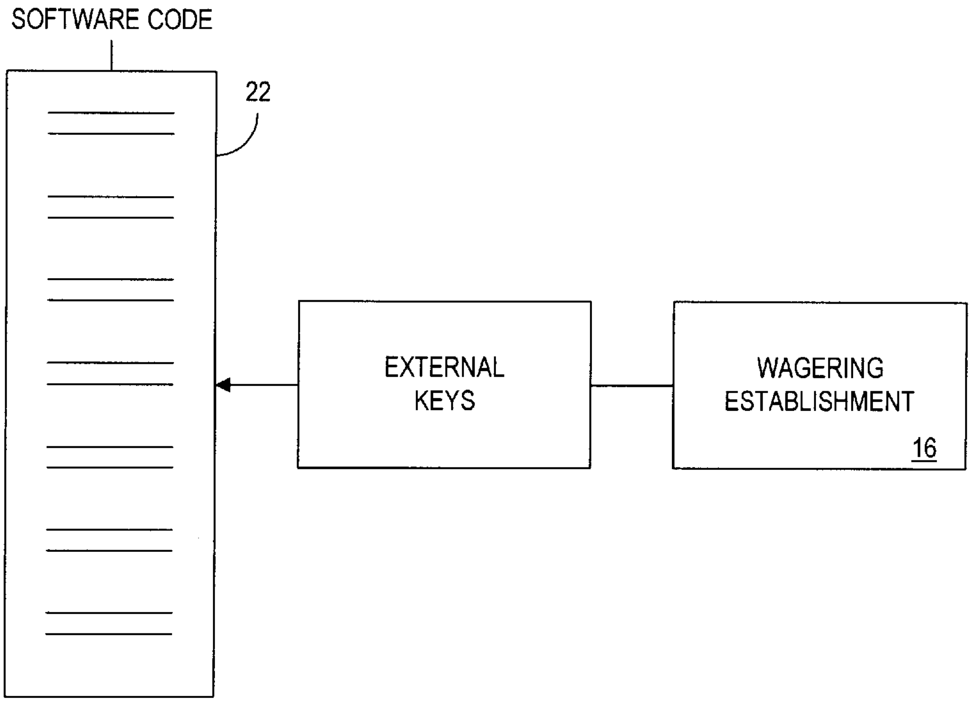
FIG. 15A is a schematic of a second means for verifying the integrity of the gaming software.
Figure 15B:
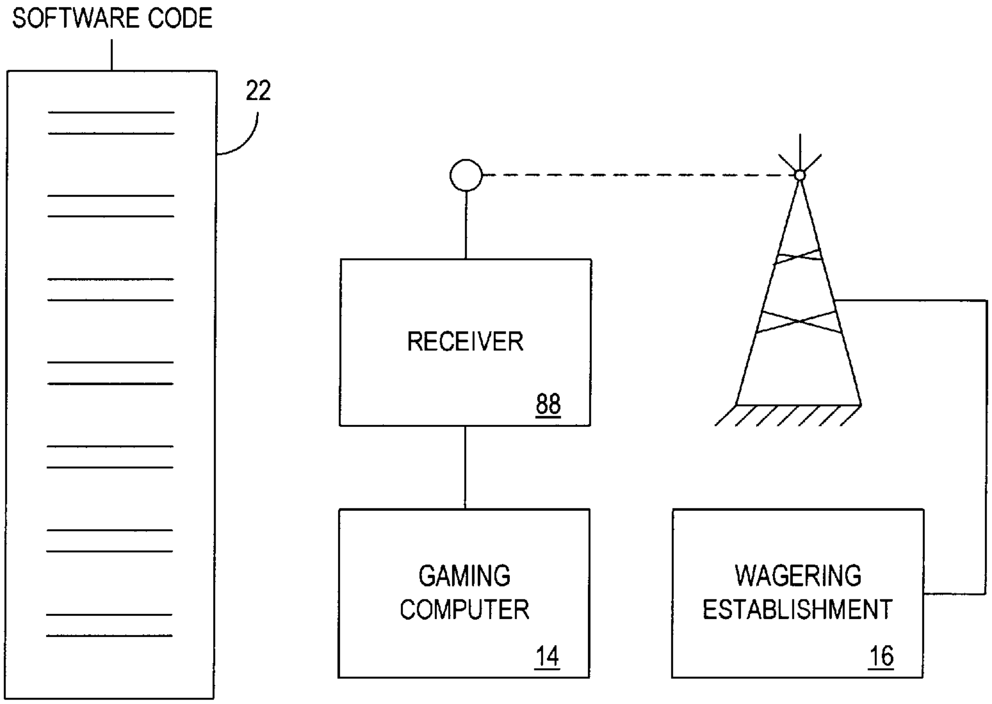
FIG. 15B is a schematic of a third means for verifying the integrity of the gaming software.
Figure 15C:
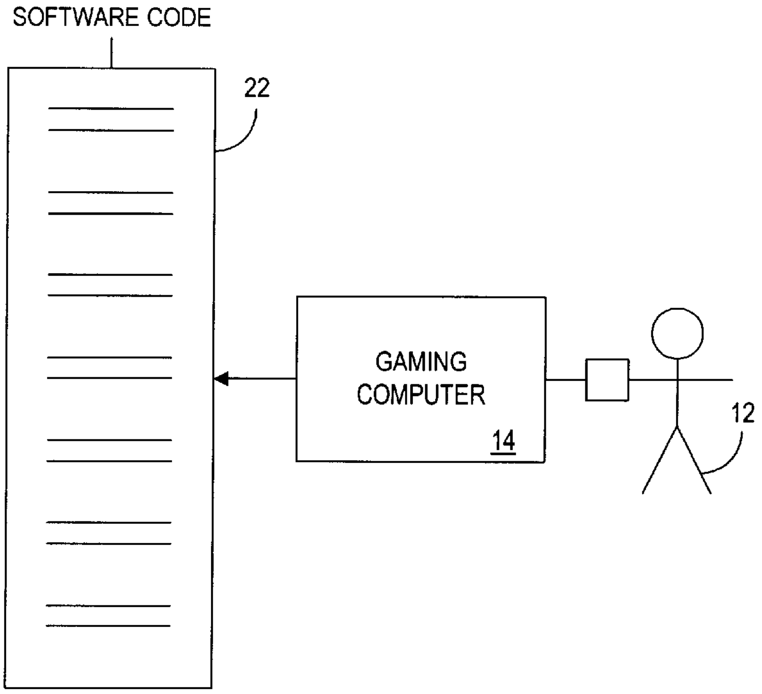
FIG. 15C is a schematic of a fourth means for verifying the integrity of the gaming software.
Figure 15D:
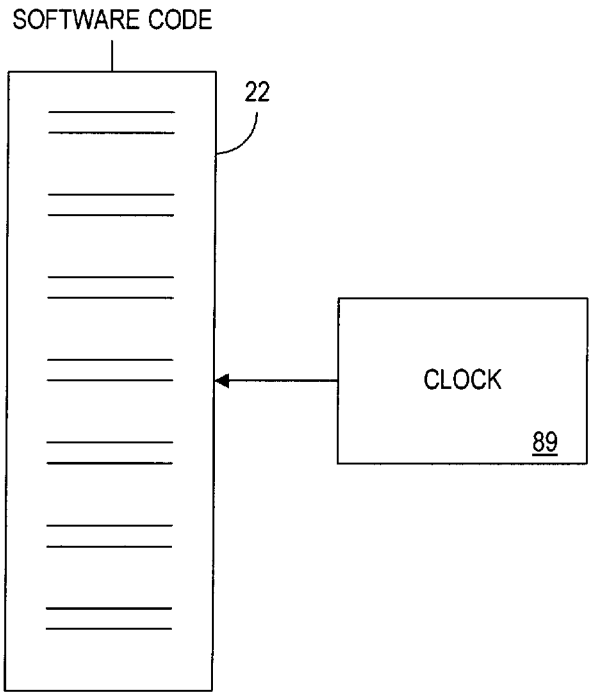
FIG. 15D is a schematic of a fifth means for verifying the integrity of the gaming software.

In a variation of the above shown schematically in FIG. 15A, external keys known only to the wagering establishment 16 can be applied to intermittently or continuously verify whether the software code has been or is being tampered with, by causing altered software to malfunction and shut down the gaming application in the computer 14. The use of external keys may or may not employ cryptographic protocols such as encryption to safeguard against their being somehow forged by the player 12. This can be implemented in several ways, including, but not limited to: (1) broadcasting a continuous or intermittent authenticatable message, such as an encoded or encrypted external signal, e.g., RF, from the wagering establishment 16, which is received by receiving means 88 operably associated with the gaming computer 14, where such signals are subsequently authenticated by the gaming computer 14, converted into the appropriate form and used by the gaming software 22 to verify or enable the same (FIG. 15B); (2) having the player 12 physically enter a message on an intermittent basis (FIG. 15C); or (3) utilizing an internally generated clock signal furnished by a hardened, tamper-resistant or tamper-evident clock 89 (FIG. 15D). In this connection, the chip 23, or even the gaming computer 14 (if provided by the wagering establishment 16), may be shielded from electromagnetic interference (EMI) by conventional methods to prevent unauthorized attempts to influence the gaming software with externally generated electromagnetic radiation.

Aside from the use of external keys, the gaming software 22 can be made to require the acquisition of data from an external source in order to function. For example, a wireless broadcast of an authenticatable message comprised of random numbers and/or alphanumeric data (possibly encrypted) might be accessed by the gaming software 22 such that these random numbers are called upon by the program as a basis to select and/or generate a wagering outcome in a predictable or unpredictable manner. Such external input may be incorporated into a hardened, tamper-resistant or tamper-evident plug-in device or module, which interfaces with the gaming computer 14.

Another way to prevent fraudulent attempts to alter the gaming software 22, is through the use of an audit program 27 which can only be accessed by the wagering establishment 16. To prevent a forged audit trail, the audit program 37 might, by way of example, create dozens or even hundreds of data strings (e.g., such as in a roulette simulation, data strings corresponding to spins of the roulette wheel each time the wheel is spun), where all such data is then recorded for future verification should the wagering establishment 16 suspect tampering with the gaming software 22.

It will be appreciated by persons skilled in the art that the gaming software 22 can be arranged such that a message or data-string of alphanumeric codes, which are either preloaded into each gaming computer 14, or provided on a disk or plug-in uncopyable module, can be used to discover any tampering with the software, disk or module by the player 12. In this connection, the code sequence can be made different for each gaming computer 14 or module, and copies of such codes can be kept on file by the wagering establishment 16. These codes may be used to provide the basis for generating a random outcome of each gaming event, and can thereby provide evidence of tampering. In other words, a specific arrangement of codes might correspond to a certain outcome of a wagering event (e.g., the Roulette wheel lands on "5"). Even though these codes are known to the wagering establishment 16, they are sequenced to ensure a random outcome—something which could be verified by an independent third party. If a player 12 seeks to modify the gaming software, the altered software instructions and/or codes could be discovered upon comparison of the same with the originals on file with, and known only to, the wagering establishment 16.

As another means of preventing player fraud, an element of "double-randomness" can be implemented by requiring the player 12 to press a button for each selection or desired response on the gaming computer 14 twice, with the time interval between selections (i.e., in milliseconds) used to address and enable a specific preprogrammed random outcome codified in corresponding software codes.

The game program 24 permits player 12 to wager on any one of a plurality of wagering opportunities, including games of chance, future public or external events where the outcome is uncertain or games of skill, e.g., a crossword puzzle. The games of chance are generated on gaming computer 14 by game program 24 in accordance with conventional techniques and include, but are not limited to, common casino wagering activities such as blackjack, craps, roulette, poker, slots and the like. Each game offers opportunities for the player 12 to place wagers on one or more various wagering elements within a given wagering event depending upon the rules applicable to that game. This will be described in more detail below.

Game program 24 can be made to accept wagers on future public or external events where the outcomes of such events are uncertain as in, for example, sporting events such as a football game or a boxing match, or a state-run or other lottery. This can be implemented by establishing communications, either orally via a public telephone network, or electronically, with the wagering establishment 16 in order to place, register and confirm bets. The wager is placed on the gaming computer 14, which, through the gaming software 22 produces a message for registration with the wagering establishment 16. This message is then time stamped by the wagering establishment 16 to form an authenticatable message, which authenticatable message can only be authenticated by the wagering establishment 16, using appropriate software instructions or hardware to lock in the bet or fix the time of the wager for the purpose of ascertaining the proper payoff. This implementation will be described in detail below. Similarly, games of skill such as a crossword puzzle can be verified through the use of an authenticated date/time message which fixes the time of completion of the game, such that prizes are later awarded based upon the first player to complete that game.

Figure 1B:
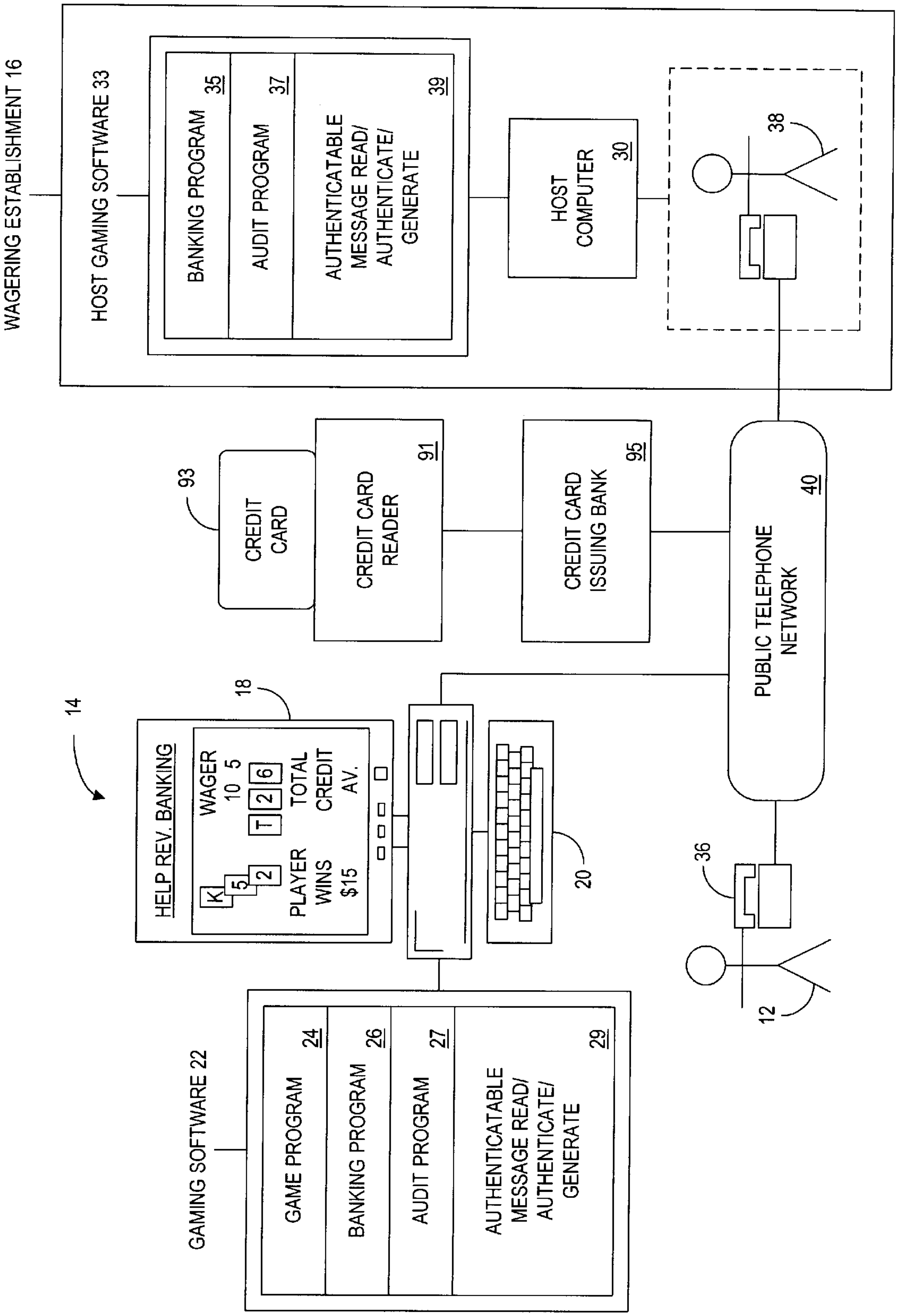
FIG. 1B is a schematic view of the remote gaming system in a second off-line embodiment.

The banking program 26 enables the player 12 to wager with available gambling credit and "cash-out" any gambling winnings. In certain embodiments, the banking program 26 facilitates the purchase of credit from the wagering establishment 16 where such credit is "loaded" into an appropriate data file in the gaming computer in the form of an authenticatable message or a series of authenticatable messages. Alternatively, as shown in FIG. 1B, the banking program can receive gambling credit electronically, such as from an electronic card reader 91 compatible with credit or debit cards 93 in a conventional manner, or by downloading the credit from a plug-in tamper resistant or tamper-evident credit module 90.

As one way of ensuring security in the credit purchase/redemption process, the banking program 26 or a dedicated authentication device provides for the authentication and generation of authenticatable messages, such as, for example, an encryption/decryption apparatus utilizing an encryption and decryption algorithm of the type known in the art, e.g., public-key, to encrypt and decrypt alphanumeric messages exchanged between the player 12 and the wagering establishment 16 which are input to, communicated between and generated by the gaming computer 14 and the host computer 30. These messages can be communicated between the player 12 and the wagering establishment 16, including its authorized "agent" 38 through a public telephone network 40. The term "agent" is intended to include an automated telephone or like system having interactive voice capabilities, which generates computerized instructions communicated to the player 12 over the phone to prompt the player 12 to communicate responses to the wagering establishment 16 by pressing the appropriate numbers or symbols on the touch-tone phone 36 by conventional methods which are well known.

The host computer 30 has gaming software 33 operably associated therewith, which software includes a banking program 35 and an audit program 37. The host computer 30 either includes or communicates with a dedicated device or software 39 for generating and authenticating authenticatable messages using cryptographic protocols with keys or secret algorithms known only to the wagering establishment 16. In this manner, the wagering establishment 16 enables a verified player 12 to purchase and redeem gambling credit at the remote location, notwithstanding the absence of any on-line link to the wagering establishment 16 and/or the host computer 30 associated with the wagering establishment 16. The sequence of steps in the illustrative embodiment required to purchase and cash-out gambling credit by exchanging and authenticating authenticatable messages off-line are described in greater detail below.

Figure 4A:
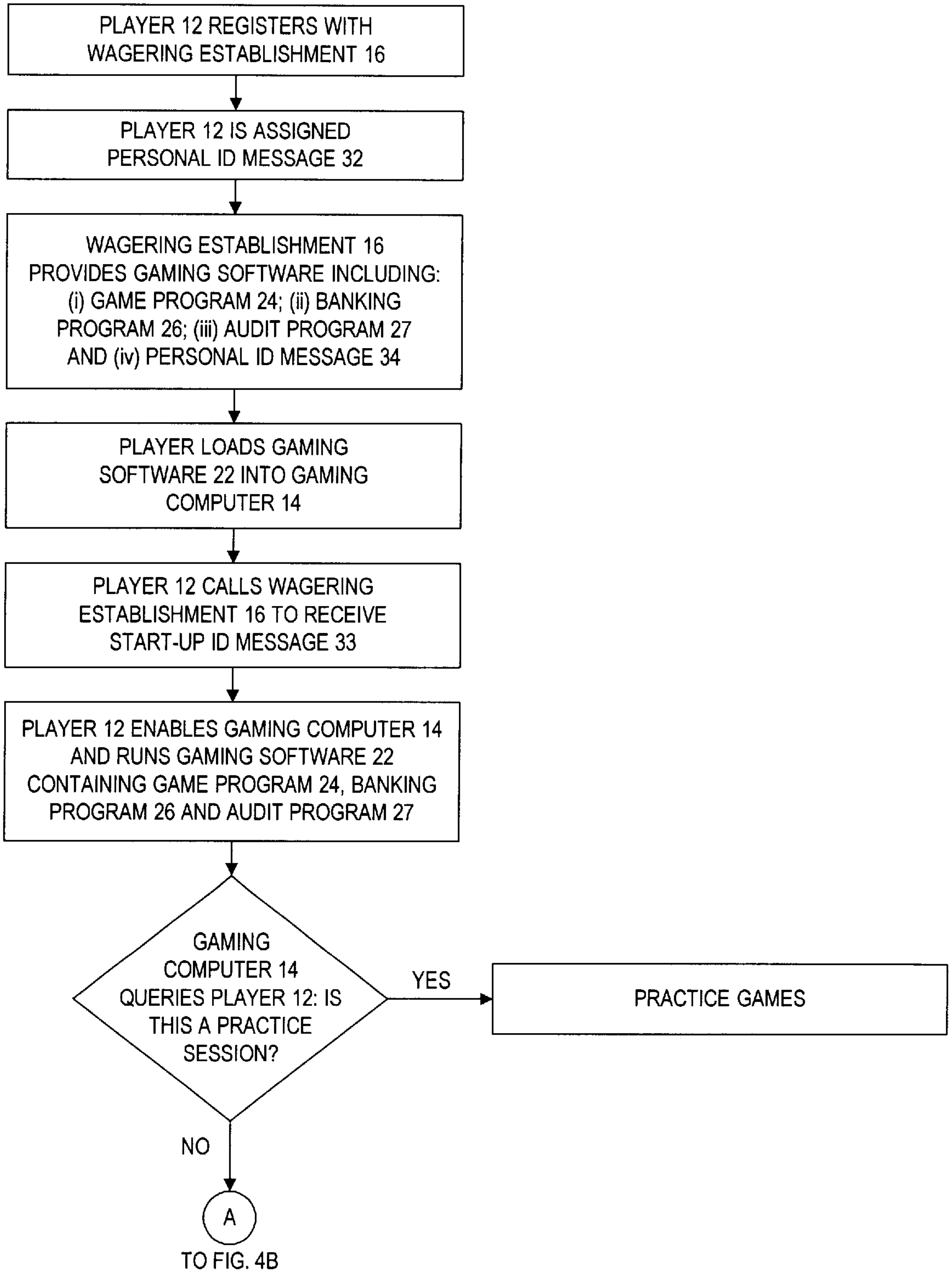
FIGS. 4A–4B are a flowchart of the start-up and registration sequence in the off-line embodiment.
Figure 4B:
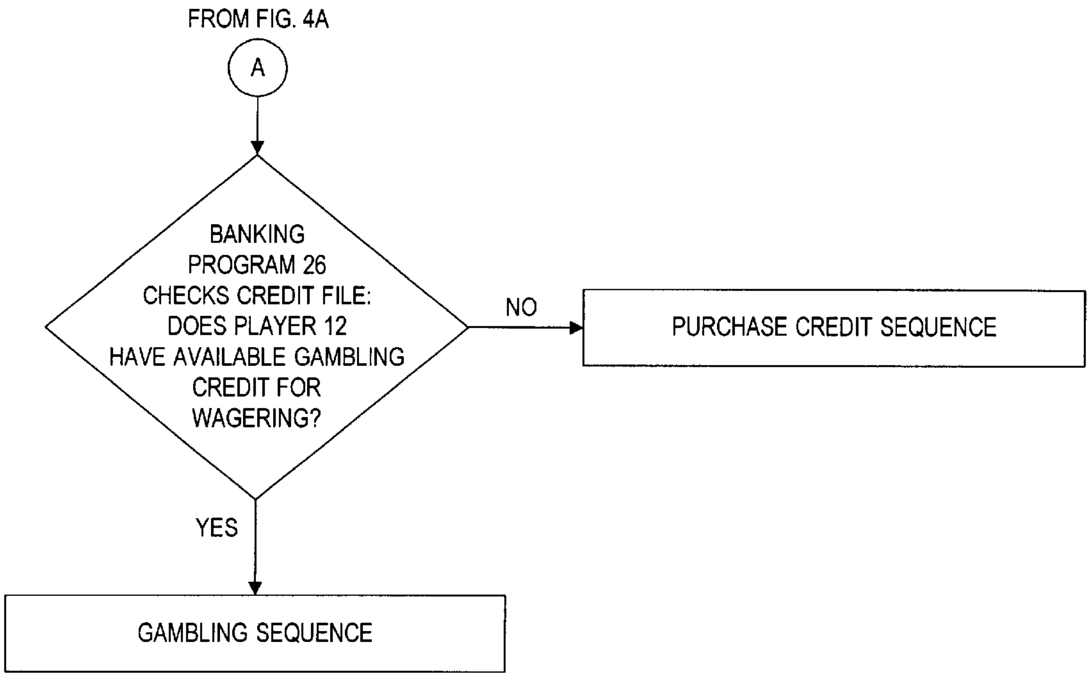

In the usual course of practicing the invention, FIGS. 4A–4B depict a flowchart of a representative start-up and registration sequence in an off-line embodiment which must occur prior to wagering. Player 12 first registers various personal information with the wagering establishment 16 and obtains an alphanumeric personal identification message or code 32. The wagering establishment 16 provides player 12 with gaming software 22 containing a game program 24, a banking program 26, and an audit program 27 as described above, having an associated software identification message or code 34. The gaming software 22 may be independently tested, verified and provided on data storage media in a sealed envelope by a third party. Such data storage media can include a hard disk, floppy disk, CD-ROM and the like. The wagering establishment 16 then provides an alphanumeric start-up identification message or code 33 which the player 12 enters into the gaming computer to run the gaming software 22. Optionally, the gaming computer 14 may utilize biometrics including, but not limited to, fingerprints, voiceprints, retinal-prints and the like, using an appropriate chip or recognition software, to deny access to any unauthorized user. Such hardware and/or software is known in the art.

The gaming software 22 is programmed to prompt the player 12 with an inquiry as to whether a current session is for practice or to place a wager. If it is a practice session, the game program 24 generates a plurality of game choices and a confirmation that the games are being played for practice only. If the player 12 chooses to engage in gambling, the banking program 26 will permit actual wagering to the extent that there is sufficient gambling credit available in the player's account to cover all bets. If there is insufficient gambling credit, the player 12 must contact the wagering establishment 16 and go through the purchase credit sequence described below. As noted above, the gaming computer 14 may or may not be on-line with the wagering establishment computer 30. If gaming computer 14 is off-line, greater flexibility in terms of being able to engage in gambling at virtually any location is possible. As discussed above, a series of authenticatable messages are communicated between the player 12 and the wagering establishment 16 permit credit purchase and redemption at a remote location to be governed by the wagering establishment 16 notwithstanding the absence of an on-line link between the gaming computer 14 and the host computer 30. Alternatively, gaming computer 14 can be networked on-line to the host computer 30 through a public telephone network 40 such that host computer 30 monitors and controls all or part of the activities taking place on the remote gaming computer 14 (see FIG. 2).

In the off-line embodiment shown in FIG. 1A, the player 12 places a call to the wagering establishment 16 by way of telephone 36 and communicates via the public telephone network 40 to obtain or redeem gambling credit. If player 12 already has credit, gaming software 22 will permit wagering on any of the games of chance, future or external events or games of skill, provided by game program 24 upon receiving player 12's appropriate personal identification message 32. If player 12 requires credit to play, the wagering establishment 16 must be contacted and the following series of steps are followed for the purpose of verifying the player's identity and confirming that the player is utilizing gaming software 22 registered to his or her personal identification message 32.

Figure 5:
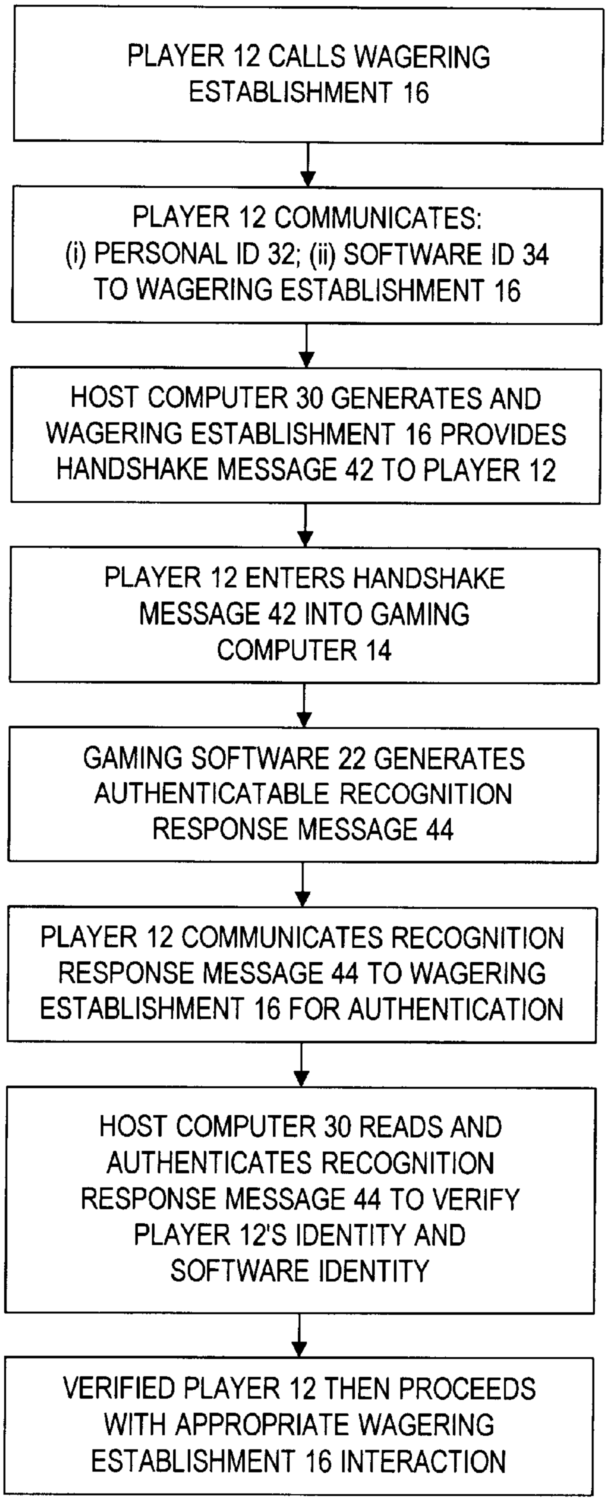
FIG. 5 is a flowchart of the handshake recognition sequence in the off-line embodiment.
Figure 6A:
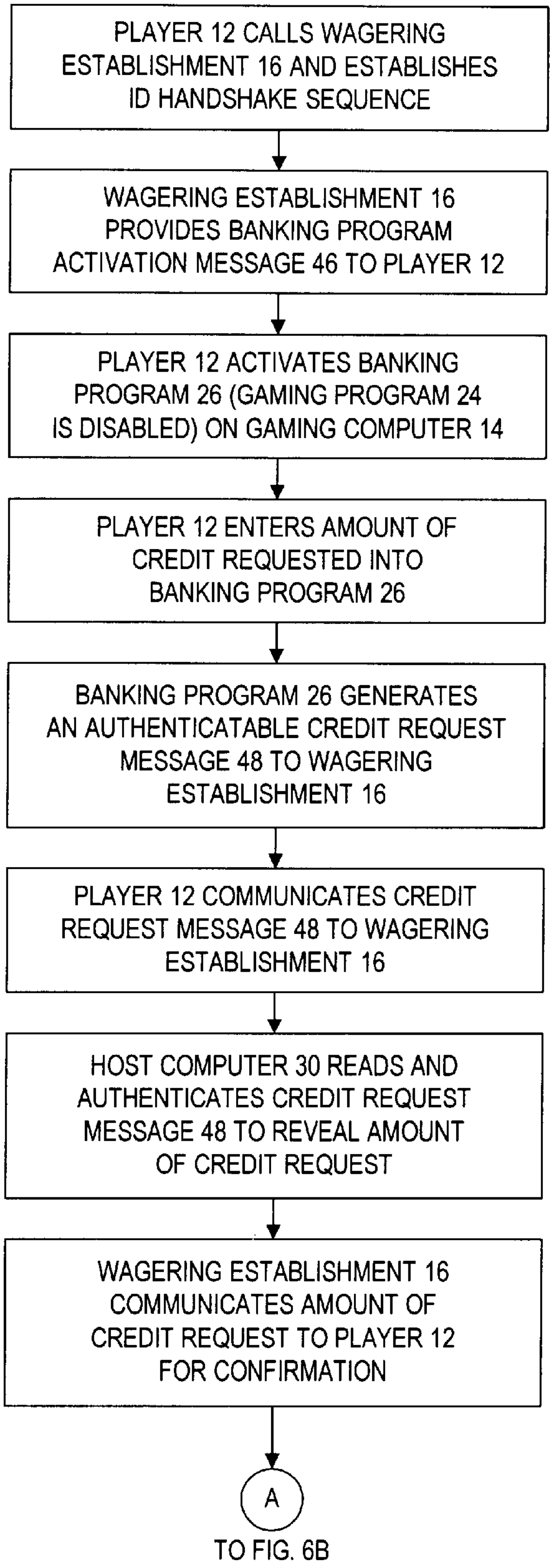
FIGS. 6A–6E are a flowchart of the purchase credit sequence in the off-line embodiment.
Figure 6B:
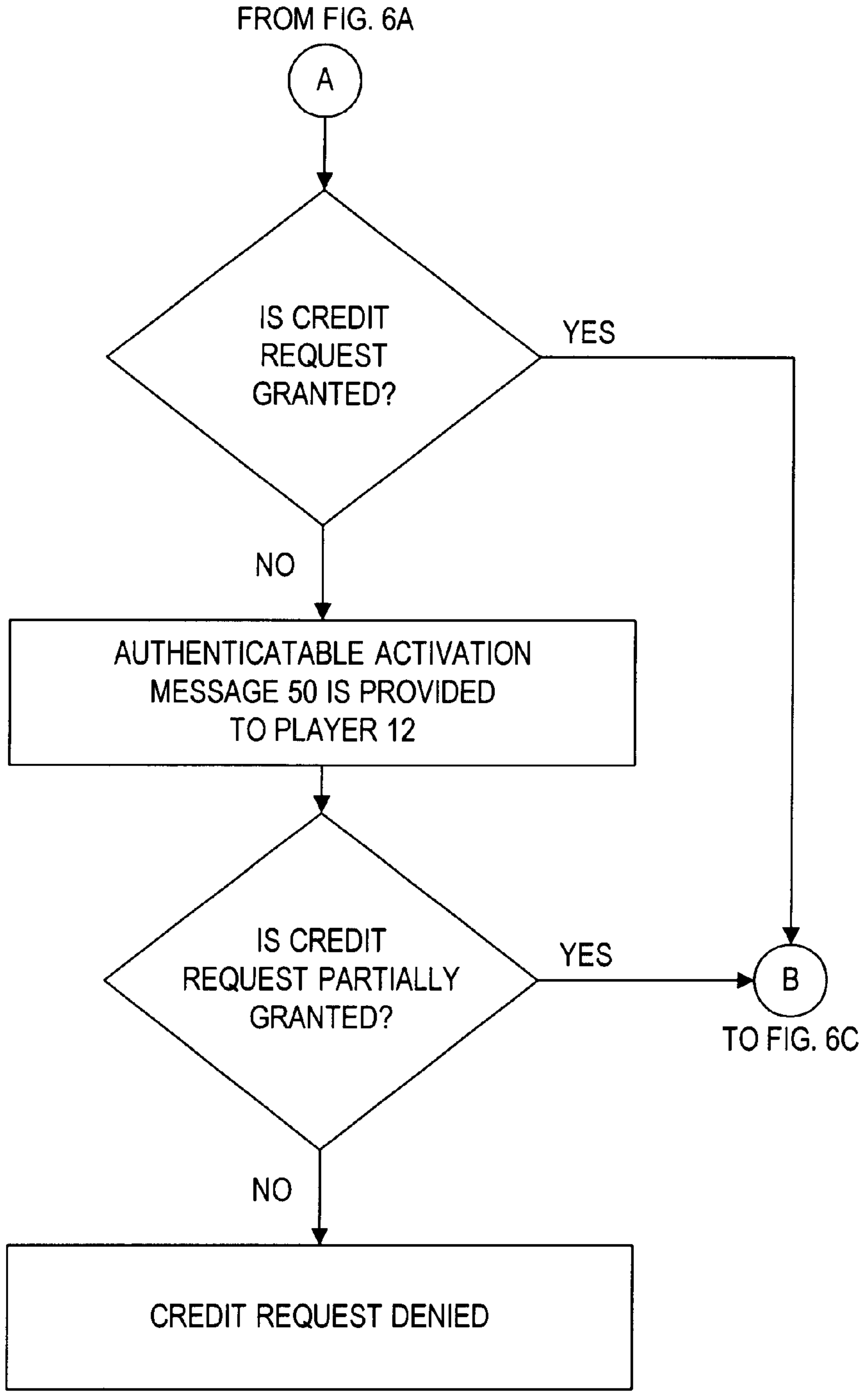
Figure 6C:
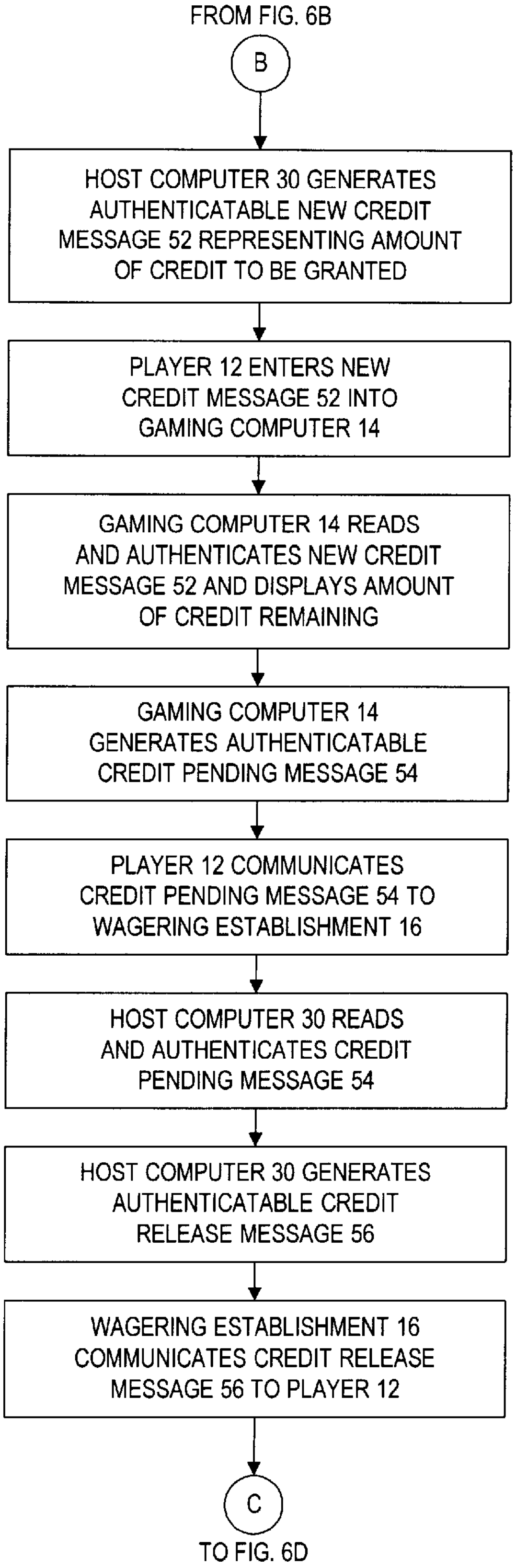
Figure 6D:
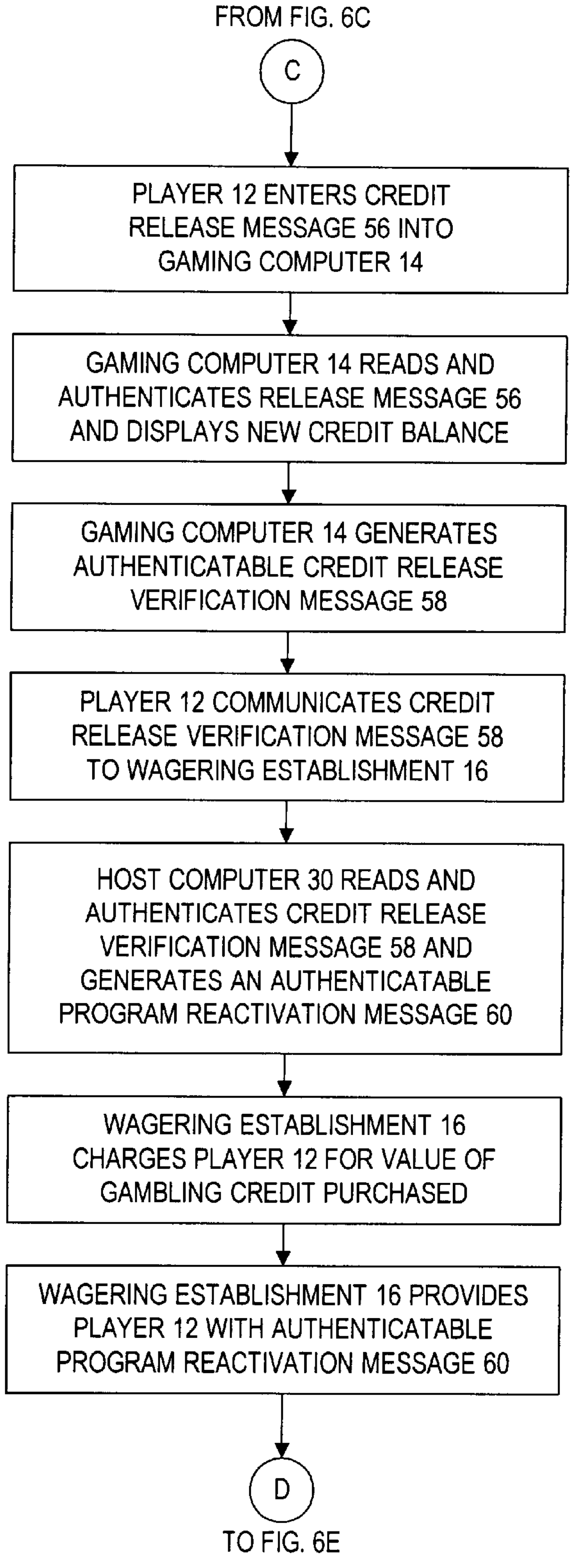
Figure 6E:
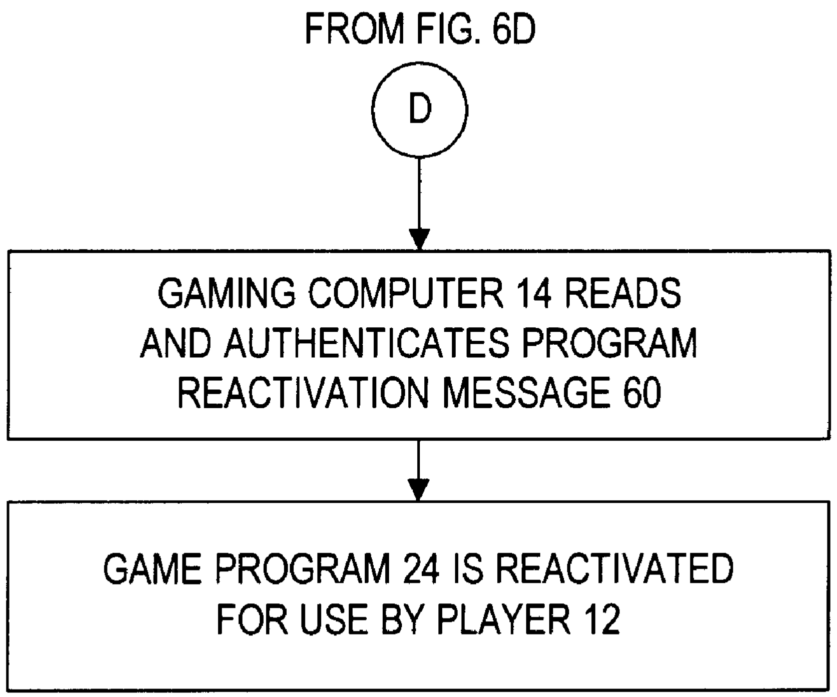

Whenever player 12 contacts the wagering establishment 16, he or she goes through what is referred to as a handshake recognition sequence, the verification of the player's identity with the wagering establishment 16. In this regard, as depicted in the flowchart of FIG. 5, player 12 first calls the wagering establishment 16 on telephone 36. The wagering establishment 16 queries player 12 for his or her unique personal identification message 32 and software identification message 34. These are provided to the wagering establishment 16, and are read by and authenticated by the host computer 30, which in turn generates an authenticatable handshake message 42 which is provided to player 12 for entry into gaming computer 14. Gaming computer 14 reads and authenticates handshake message 42 and then generates an authenticatable recognition response message 44 which is provided to the wagering establishment 16. The host computer 30 reads and authenticates recognition response message 44 to verify the player 12's identity and to confirm that the specific gaming software 22 is registered to that player 12. The verified player 12 then proceeds with appropriate interaction by the wagering establishment 16.

FIGS. 6A–6E are a flowchart depicting a first embodiment of a purchase credit sequence in the off-line embodiment. Player 12 first contacts the wagering establishment 16 and establishes his or her identification through the handshake sequence depicted in FIG. 5 and described above. The host computer 30 generates an authenticatable banking program activation message 46, and the wagering establishment 16 provides the activation message 46 to the player 12 for the purpose of allowing player 12 to access the credit purchasing/redemption function of the banking program 26 in gaming computer 14. Player 12 then enters the amount of gambling credit requested, and the authentication software 29 combines the personal identification message 32 and software identification message 34 to generate an authenticatable credit request message 48, which embodies the numeric value of the amount of gambling credit requested and is unique to player 12 and his or her gaming software 22. The player 12 communicates the credit request message 48 to the wagering establishment 16, where the host computer 30 reads and authenticates the credit request message 48 to reveal the amount of credit requested by the player 12. The amount of gambling credit requested is confirmed with the player 12. The wagering establishment 16 then decides whether or not to provide all or part of the gambling credit requested. If the credit request is denied, player 12 is given an authenticatable reactivation message 50 which is read and authenticated by gaming computer 14 to enable player 12 to continue wagering with any available gambling credit balance. Alternatively, the player 12 has the option to cash-out any gambling winnings in accordance with the sequence depicted in FIGS. 8A–8C and described below. If the credit request is partially or fully granted, the process continues for the amount of gambling credit the wagering establishment 16 is willing to sell to the player 12. The host computer 30 generates an authenticatable new credit message 52 which is provided to player 12 for the purposes of loading a pending amount of credit requested into the player's gaming computer 14 via the banking program 26 of the gambling software 22. The gaming computer 14 reads and authenticates the new credit message 52 and displays the exact amount of new credit added to player 12's available gambling credit balance. The amount of new gambling credit is shown to player 12 as pending, but is not yet available for use. Banking program 26 then instructs authentication software 29 to generate an authenticatable credit pending message 54 which is based in part on the monetary value of the new credits pending. The player 12 communicates this credit pending message 54 to the wagering establishment 16 where it is read and authenticated by the host computer 30 to positively and irrefutably verify that the specific amount of gambling credit requested was properly loaded into player 12's banking program 26. The host computer 30 then generates an authenticatable credit release message 56. This credit release message 56 is provided to the player 12, and then read and authenticated by the gaming computer 14 to release the amount of pending gambling credit in banking program 26. The gaming computer generates an authenticatable credit release verification message 58 which the player 12 provides to the wagering establishment 16. The host computer 30 then reads and authenticates the credit release verification message 58 and in turn generates an authenticatable program reactivation message 60. The reactivation message 58 is communicated to the player 12, and thereafter read and authenticated by the gaming computer 14 to enable the game program 24. Simultaneously or subsequently, the wagering establishment 16 charges the player 12 for the value of gambling credit purchased in a manner mutually agreed upon by the player and the wagering establishment 16. For example, a credit card may be charged, a bank transfer authorized, or some other form of payment or delayed payment may be made to the casino in exchange for the credits purchased. If at any point during this process one or more of the various authenticatable messages do not match those expected by the respective authentication software and/or hardware associated with the gaming computer 14 and the host computer 30, the player 12 is denied access to the banking program and associated gambling credit, and the gaming software 22 in such cases is disabled until the dispute is resolved. In this manner, the correct generation and authentication of each of the various messages communicated between the gaming computer 14 and the host computer 30 positively confirms the amount, value and authenticity of gambling credit obtained by or made available to the player 12.

Figure 1C:
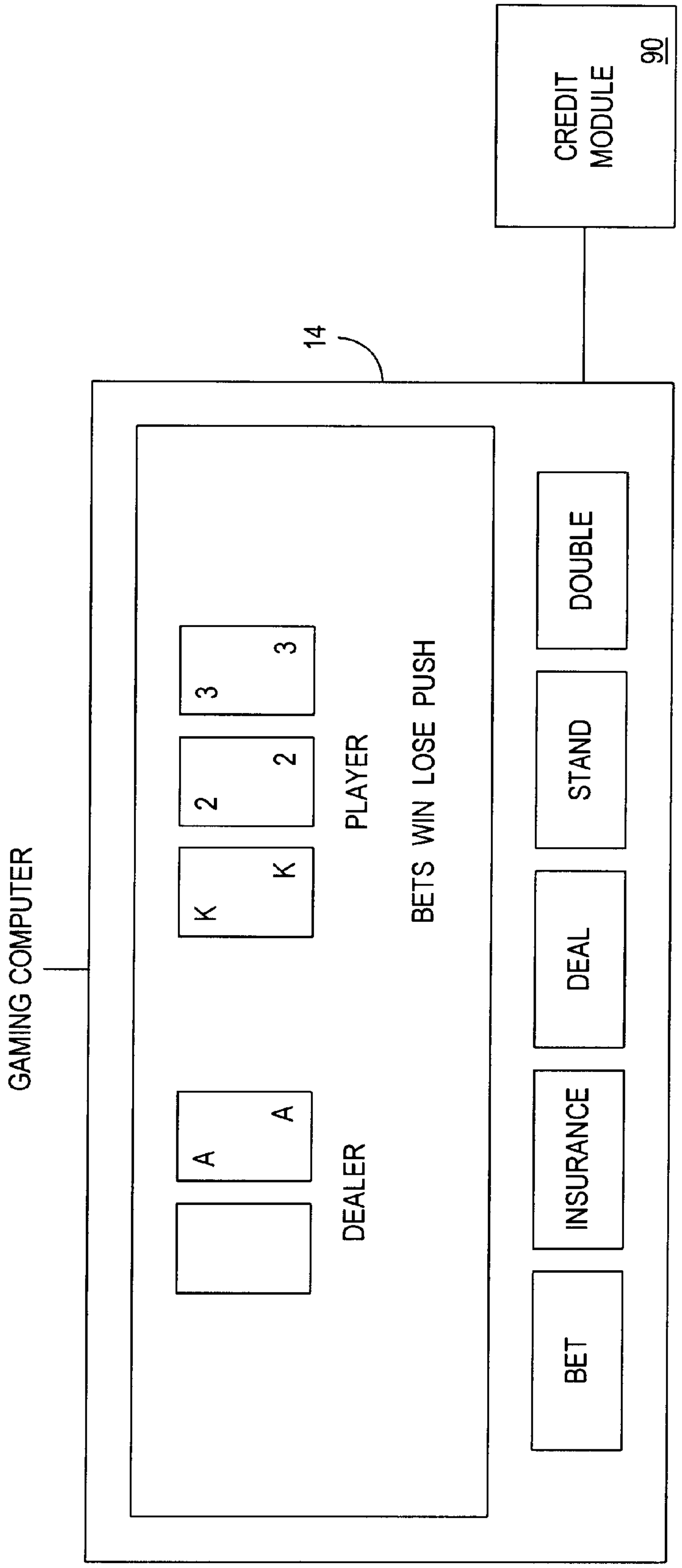
FIG. 1C is a schematic view of the remote gaming system in a third off-line embodiment.

It will be appreciated that gambling credit can also be furnished to the player 12 in predetermined amounts and/or preinstalled on a dedicated gaming computer 14, e.g., a personal digital assistant, provided by the wagering establishment 16. Alternatively, the player 12 can obtain a disk or module 90, as shown in FIG. 1C, having a specified amount of authorized credit which is then "loaded" into the banking program 26 associated with the gaming computer 14 to enable wagering to the extent of the available gambling credit balance. Alternatively, as shown in FIG. 1B, the player 12 can obtain gambling credit using his or her own credit card 93, either through oral or electronic communications with the wagering establishment 16, or via an electronic card-reader apparatus 91 connected to the credit card issuing bank 95 in the conventional manner.

Once the player 12 has obtained gambling credit, he or she may place wagers by selecting wagering elements within various wagering events in any one of a plurality of games of chance offered by the game program 24 of gaming software 22. Each game provides opportunities for player 12 to place wagers on one or more various wagering elements within a given wagering event depending upon the rules applicable to that game. As an example, the casino game of roulette involves a series of wagering events based upon the outcome of a random number selected by a ball spun within a roulette wheel. Each spin of the wheel is a single wagering event. Within that event, the player 12 may bet on many different wagering elements such as red and black colors, single numbers, groups of numbers and the like. All wagers for each event are placed prior to the spin of the wheel.

Figure 7A:
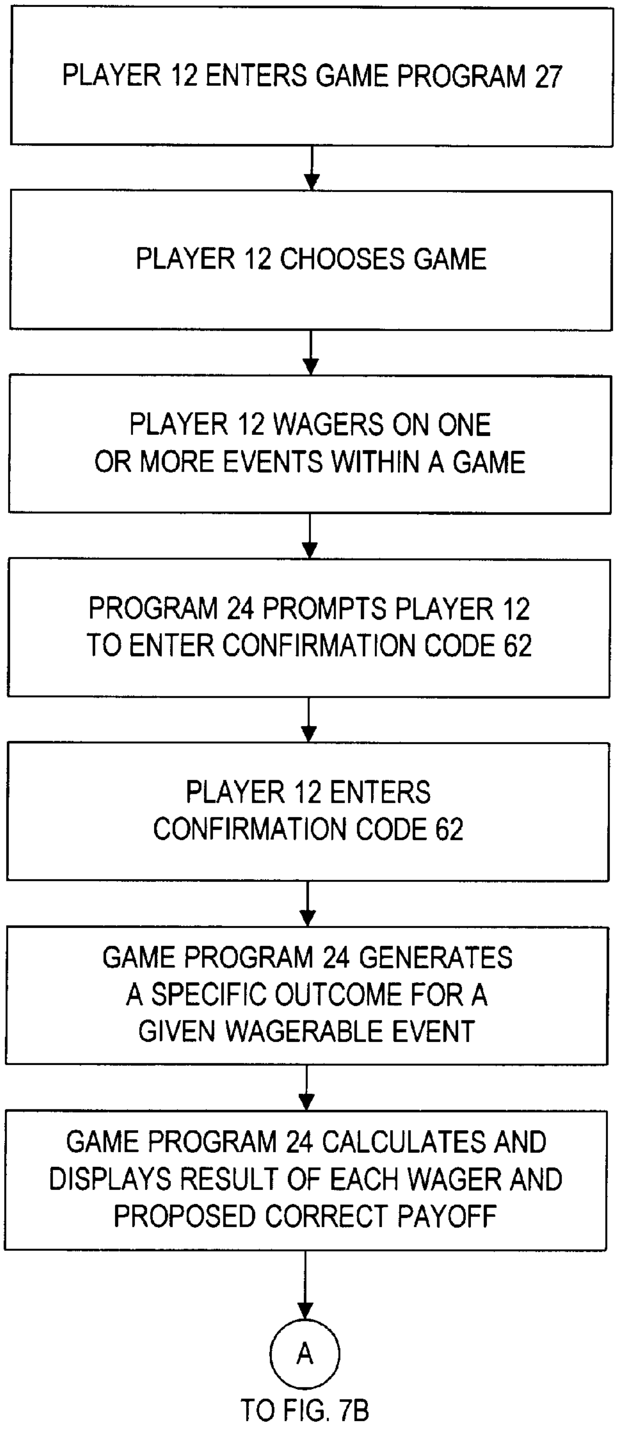
FIGS. 7A–7B are a flowchart of the wagering sequence for games of chance generated by the game program in the off-line embodiment.
Figure 7B:
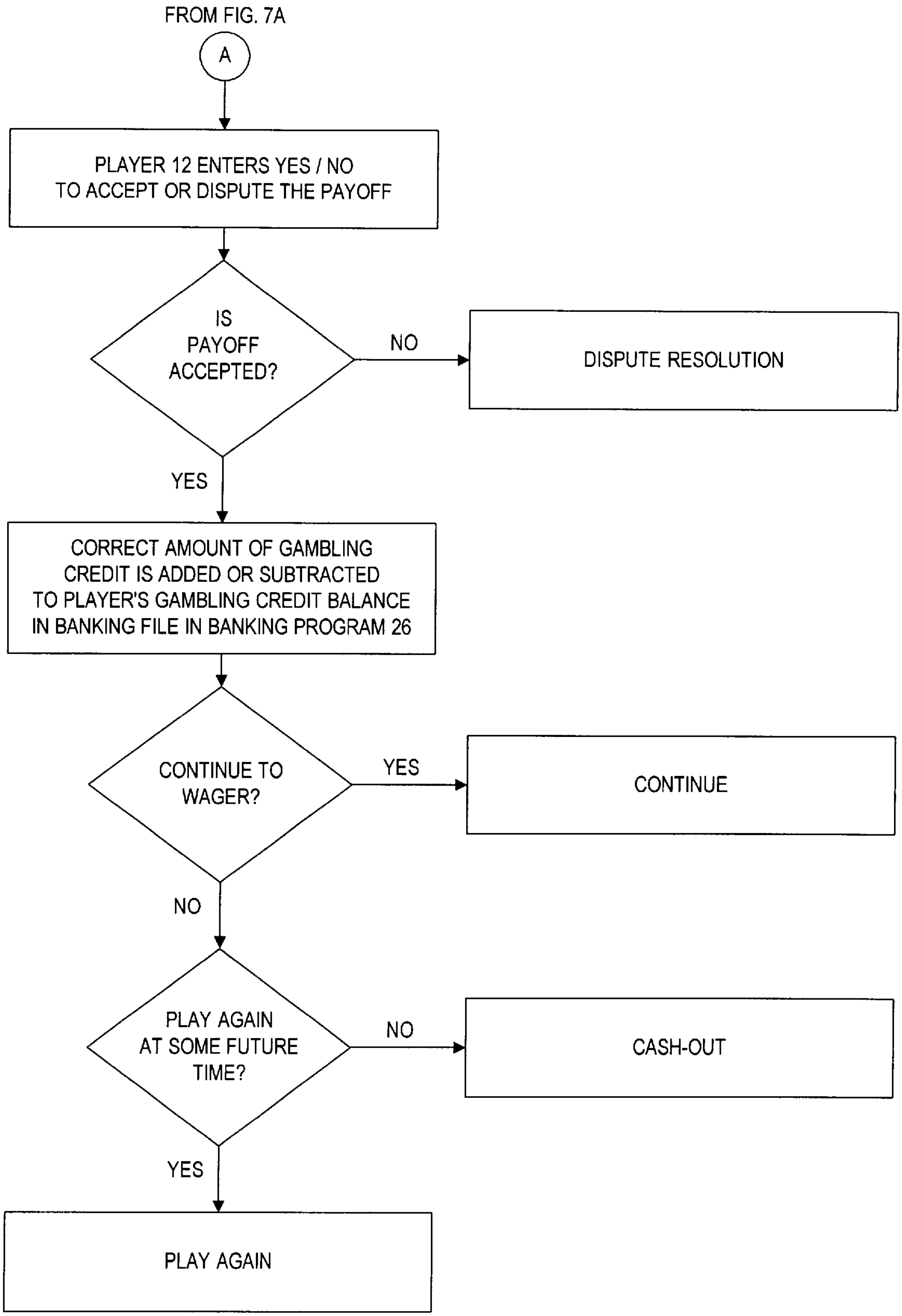

FIGS. 7A–7B are a flowchart depicting the wagering sequence for games of chance created by the game program 24 which proceeds as follows. The player 12 first makes the appropriate selections on the gaming computer 14 to enter the game program 24 of the gaming software 22, and then chooses a particular game on which to wager. The player 12 can wager on one or more events within the game as described above. The game program 24 prompts the player 12 to confirm the placement of wagers made and the total amounts of wagers entered. Such wagers may be withdrawn or modified until such time as they are confirmed. Confirmation is typically made by having the player 12 enter a confirmation message 62 prior to closing of all bets. The confirmation message 62 is generated by the gaming software 24, and can be made different for every wager for security reasons. It can be a simple one or two digit alphanumeric message which is read and used by the game program 24 to confirm that each bet placed for any wagering event was, in fact, what was intended by the player 12 and not placed in error. The game program 24 can be set up such that the confirmation message 62 may be simplified further to a single key stroke in certain highly repetitive games such as, for example, slots, or when the total value of all wagers falls below a certain predetermined level. After confirmation message 62 has been entered by player 12, the game program 24, in accordance with the rules of a given casino game, generates a specific outcome for a given wagerable event (e.g., cards are dealt, the wheel is spun, etc.). The game program 24 determines the outcome of each wager placed (win, lose or draw), calculates and then displays the proposed correct payoff for that wager on the gaming computer 14. The player 12 has the option to type in a yes/no message to accept the payoff outcome of all wagers or to dispute any payoff which the player 12 believes to be incorrect in some fashion. Any dispute can be handled by suspending the wagering process and calling the wagering authority 16 to resolve the matter by telephone or by some other means of dispute resolution. Once the player 12 accepts the resolution of a given wagering event, the correct amount of gambling credit is added or subtracted from player 12's gambling credit balance by the banking program 26. Player 12 can then begin the wagering process all over again on a subsequent wagering event, or choose to end the gambling session. At any time, the player 12 may select a review mode in the game program 24, and can review the amount and resolution of each and every wager made by the player 12 and the results of such wagers in chronological order. At any time, the player 12 can choose to redeem or cash-out all or part of the balance of gambling credit stored in banking program 26 through a credit cash-out sequence. If desired, the game program 24 may contain special built-in instructions to place limitations on winnings at the discretion of the wagering establishment. It is also anticipated that such gaming software 22 could be embedded in another product, such as in a computer or other software, to provide a premium application which enables the purchaser of unrelated products to win something as governed by such an embedded program (e.g., a cash prize awarded).

FIGS. 7C–7D and FIGS. 7E–7I are flowcharts of wagering sequences for future public events of which the outcome is uncertain, such as a lottery, in the off-line embodiment. With regard to the following discussion and appended claims with respect to lotteries, the wagering establishment will be hereinafter identified as a "lottery authority" for clarity. To participate in a lottery, the player 12 selects a particular lottery event, i.e., a drawing, generated by the game program 24 on which to wager. The gaming computer 14 then generates a lottery "ticket" layout unique to the specific lottery and the player selects the desired wagering elements (i.e., numbers).

Figure 7C:
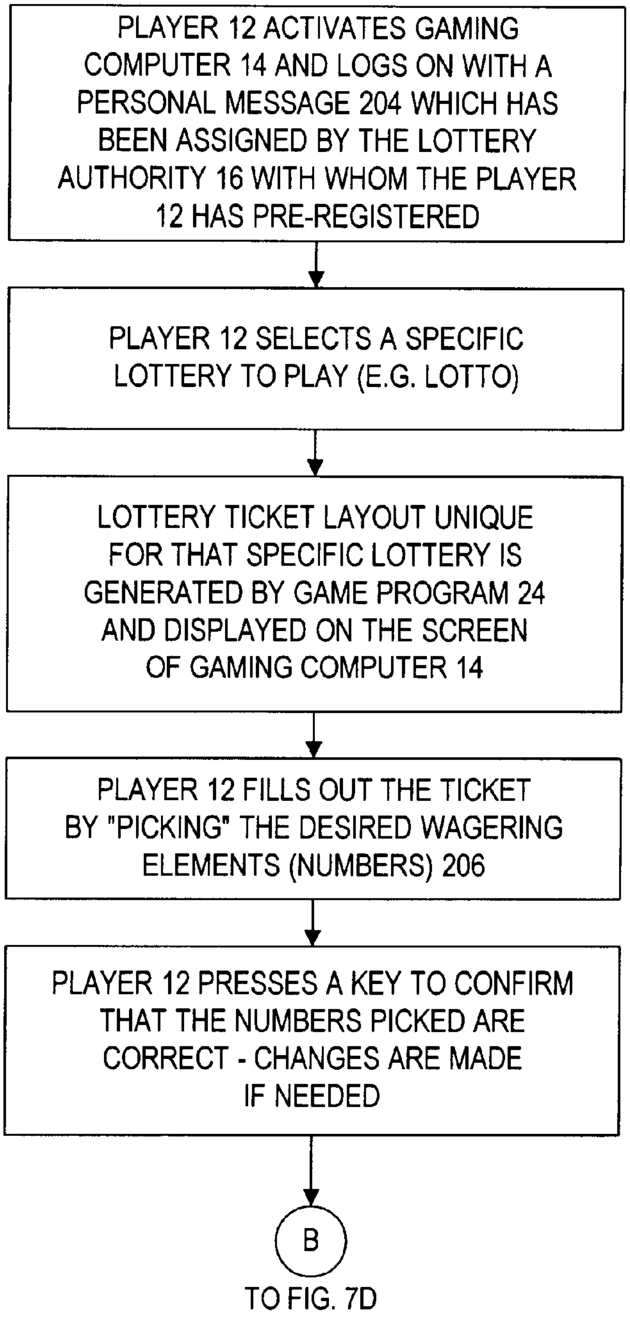
FIGS. 7C–7D are a flowchart of the wagering sequence for an off-line non-registered lottery system embodiment.
Figure 7D:
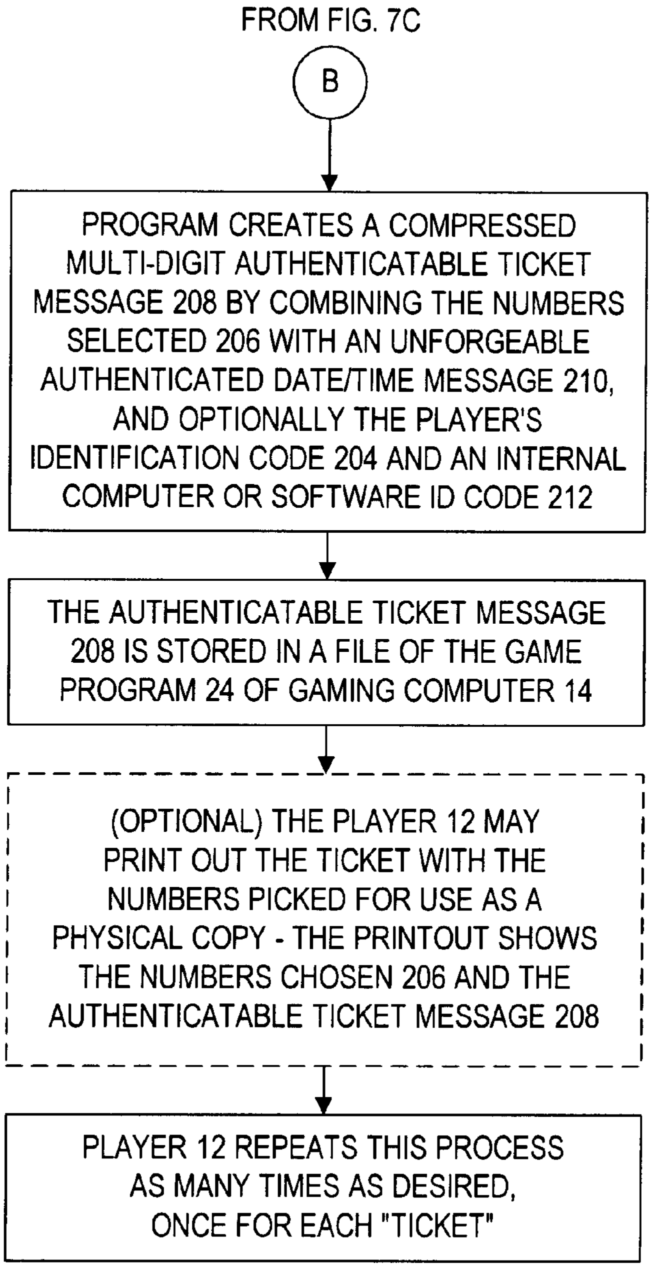
Figure 7E:
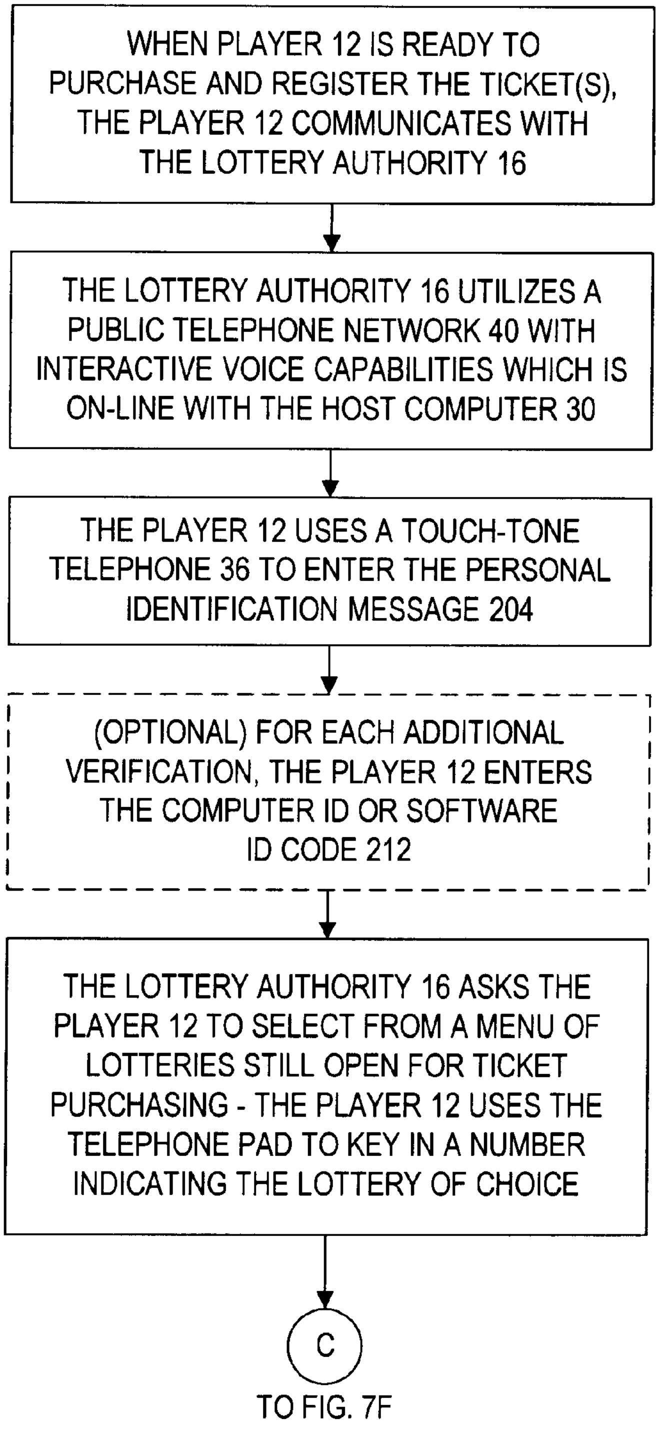
FIGS. 7E–7I are a flowchart of the wagering sequence in an off-line registered lottery system embodiment.
Figure 7F:
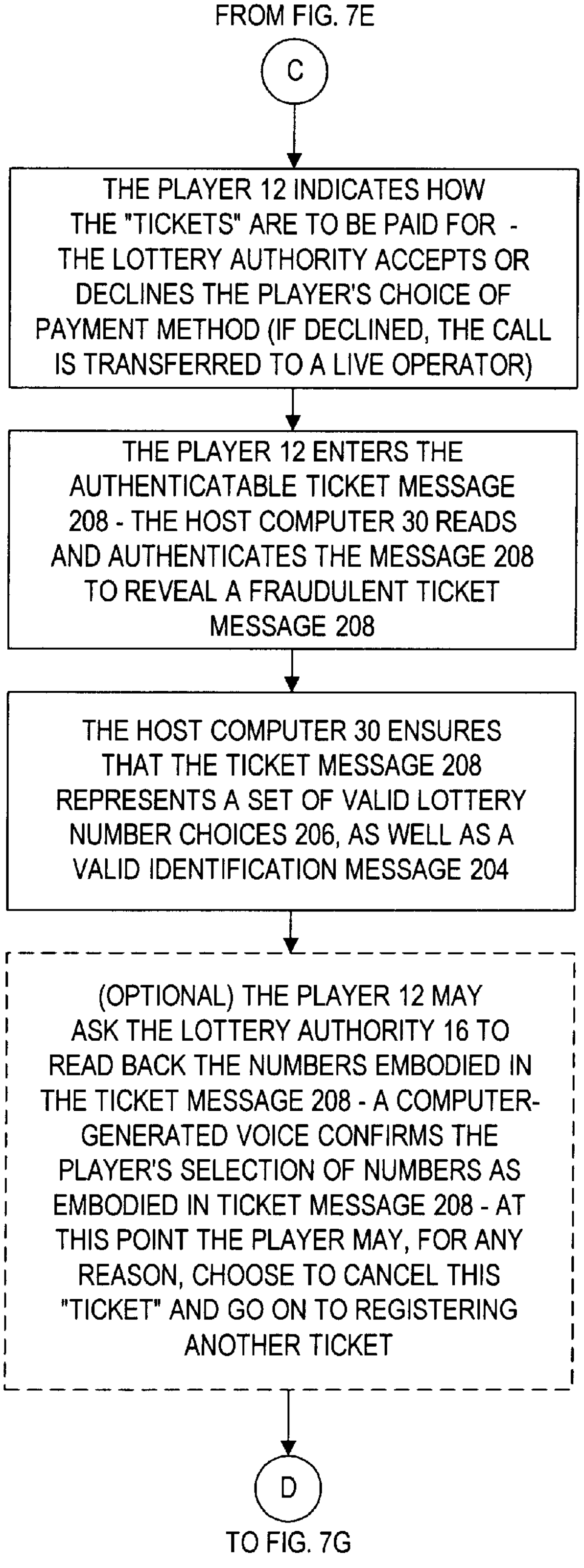
Figure 7G:
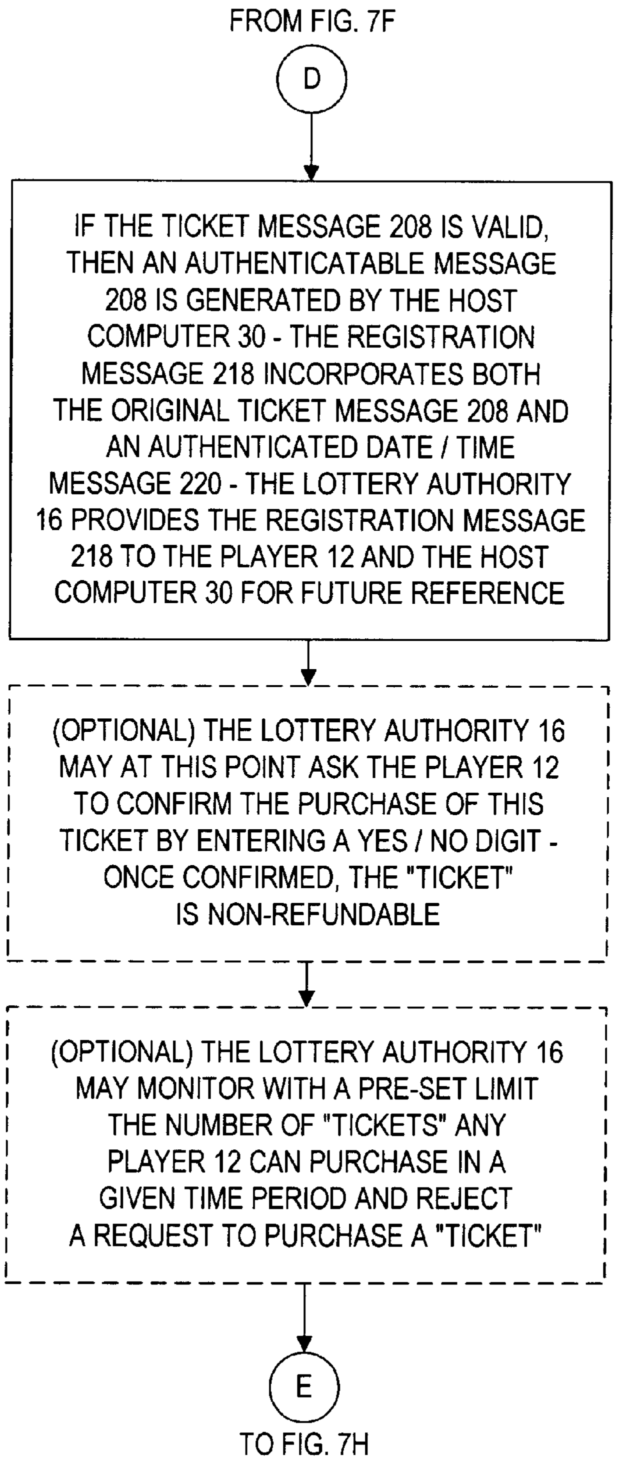
Figure 7H:
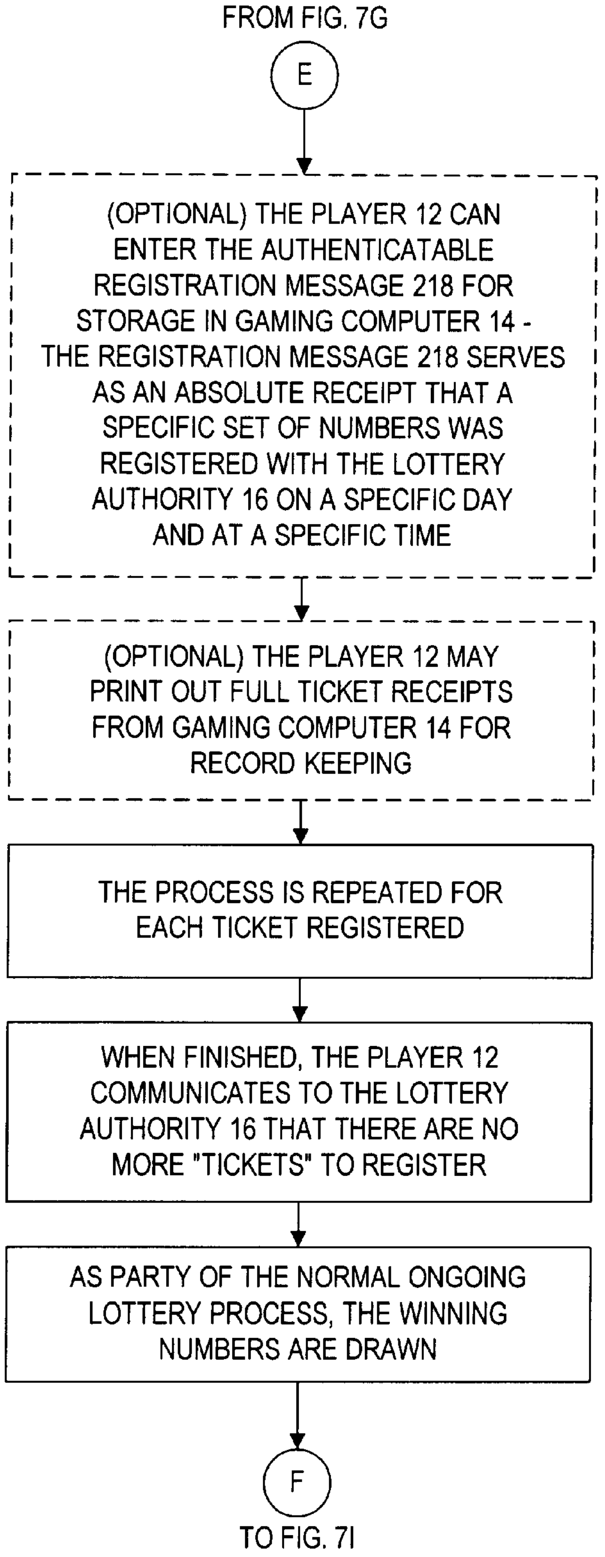
Figure 7I:
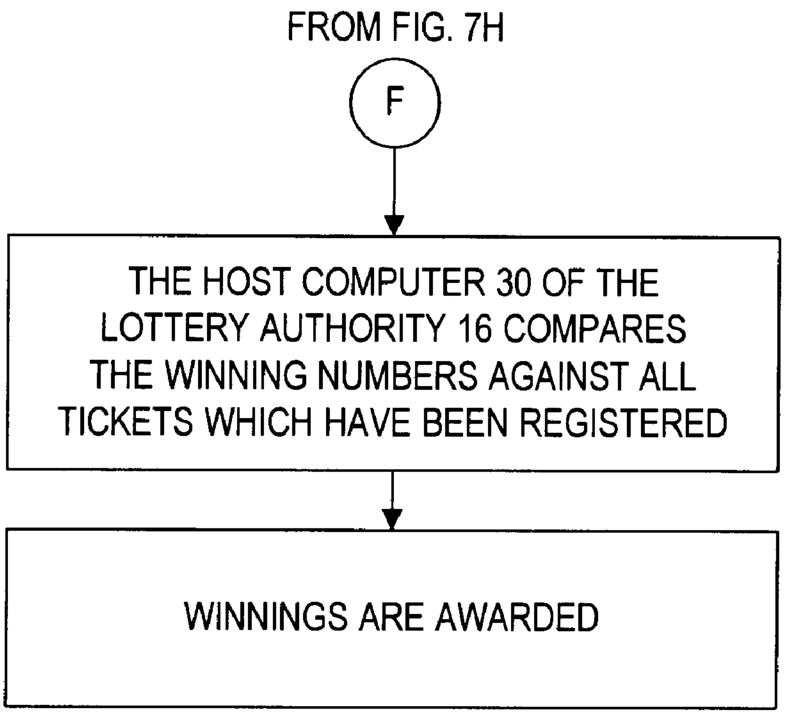

There are two types of exemplary lotteries described herein, the first classified as an instant type analogous to common scratch-off tickets, and the second characterized as future or external events of which the outcome is uncertain, i.e., a drawing takes place. It will be appreciated by the persons skilled in the art that a remote gaming arrangement whereby the player 12 participates in a lottery can be classified as either: (1) a non-registration system (by which the player wagers independently of the lottery authority 16 and where the wager need not be registered with the lottery authority since the gaming software 22 or some other software or device associated with the gaming computer 14 provides a means of time-stamping the wager); or (2) a registration system (by which the player 12 chooses the wagering elements on the remote gaming computer 14, but then must contact the lottery authority 16 in order to "register" the wager). In the case of instant lotteries, verification of the date/time of the wager is not important, since, by definition, the essentially instantaneous output of the game program 24 determines the outcome. On the other hand, in lotteries based upon future events, the date and time of the wager is critical in a non-registration embodiment. A non-registration embodiment is depicted in FIGS. 7C–7D, and the wagering sequence associated therewith proceeds in the following manner. The player 12 logs onto the lottery application in the gaming computer 14 with his or her unique personal identification message 204, which has been preassigned by the lottery authority 16 with whom the player 12 has preregistered. In this regard, an external authentication apparatus such as an encryption/decryption device 82, depicted in FIG. 2 and described in more detail below, can be used to prevent minors from accessing the lottery program. Such a device can also employ, for additional verification, biometrics such as fingerprint, voiceprint or retinal-print recognition hardware and/or software. The player 12 then selects a specific lottery to play (e.g., Lotto), and selects the desired wagering elements 206 in a conventional manner, which choice(s) may be confirmed upon the player receiving a suitable prompt. The gaming computer 14 then generates an authenticatable ticket message 208 representing the selected wagering elements 206, and uses a hardened, tamper-proof or tamper-resistant clock to generate an authenticatable date/time message 210. This ticket message 208 may include a personal identification message 204 and/or software identification message 212. The ticket message 208 is stored in the gaming computer 14 and can be read and authenticated only by the host computer 30 associated with the lottery authority for verification. If desired, a physical "ticket" representing the player's choice of wagering elements as embodied in the authenticatable ticket message 208 can be printed out by conventional printing means associated with the gaming computer 14. This procedure may be repeated as many times as necessary to participate in multiple lottery events or to chose wagering elements for a single event. Such an arrangement allows wagering to take place independent from the lottery authority 16. The authenticatable date/time message 210 ensures that the player 12 cannot tamper with the wager "after the fact", i.e., after the drawing, the player cannot modify the numbers selected to produce a "winning ticket." To cash-out, the player 12 provides the authenticatable ticket message 208 to the lottery authority 16 and the host computer 30 reads and authenticates the ticket message 208 to reveal the selected wagering elements and the date/time of the wager. Winnings are then awarded in a conventional manner. It is anticipated that large payoffs will require that the player 12 physically return the gaming computer 14, if provided thereby, or any detachable data memory media, to the lottery authority 16 to enable inspection for any indication of tampering.

FIGS. 7E–7I depict a registration sequence whereby the player 12 registers his or her lottery choice(s) with the lottery authority 16 prior to a lottery drawing. When the player 12 is ready to do so, the lottery authority 16 is called through a public telephone network. The player 12 then enters his or her unique PIN message 204, either by pressing the appropriate keys on the telephone pad, on the gaming computer 14 (if these are placed on-line in either a temporary or permanent connection), or by speaking the selections through the telephone for acquisition by a voice recognition program of the type known in the art. For additional verification, the player 12 can be asked to enter a computer or software identification message 212. The lottery authority 16 then requests that the player 12 choose from a menu of lotteries which are still open for wagering, make the desired selection(s), and indicate the method of payment. In certain applications, gambling credit can be preinstalled on the gaming computer 14 or module 90, as described above, in which case such credit can be included and represented in the authenticatable ticket message 208. Normally, the ticket-message 208 need not be authenticatable in a registration embodiment (i.e., it merely represents the choice of wagering elements). If the ticket message is authenticatable, it is then read and authenticated with a means known only to the lottery authority 16. This ensures and verifies that a valid lottery selection and sufficient credit were entered. The lottery authority 16 may confirm the transaction by reading back the wagering elements embodied in the message. After the lottery authority 16 accepts the ticket message 208, it generates a registration message 218 (authenticatable or non-authenticatable) which embodies the ticket message 208 and a current authenticatable date/time message 220, i.e., a "time-stamp". The registration message 218 can be provided to the player 12 and is stored by the lottery authority 16 in the host computer 30 for future reference. The lottery authority 16 can then prompt the player to confirm the wager by entering a simple yes/no response. If desired, the lottery authority 16 can impose a limit on the number of wagers per player or per given time period and reject wagers exceeding set amounts. Optionally, the player 12 may obtain printed ticket receipts which include the registration message 218 from the gaming computer 14. The wagering process may be repeated for each "ticket" registered. When he or she is finished, the player 12 simply hangs up or terminates the connection with the lottery authority 16. After the lottery drawing or process, the lottery authority 16 compares any winning numbers against all registered tickets in accordance with conventional practice. If the prize is below a specific threshold (e.g., $100), then such prize can be credited to the player's account or credit card, or, if above a certain threshold, payouts can be made in a conventional manner.

Figure 8A:
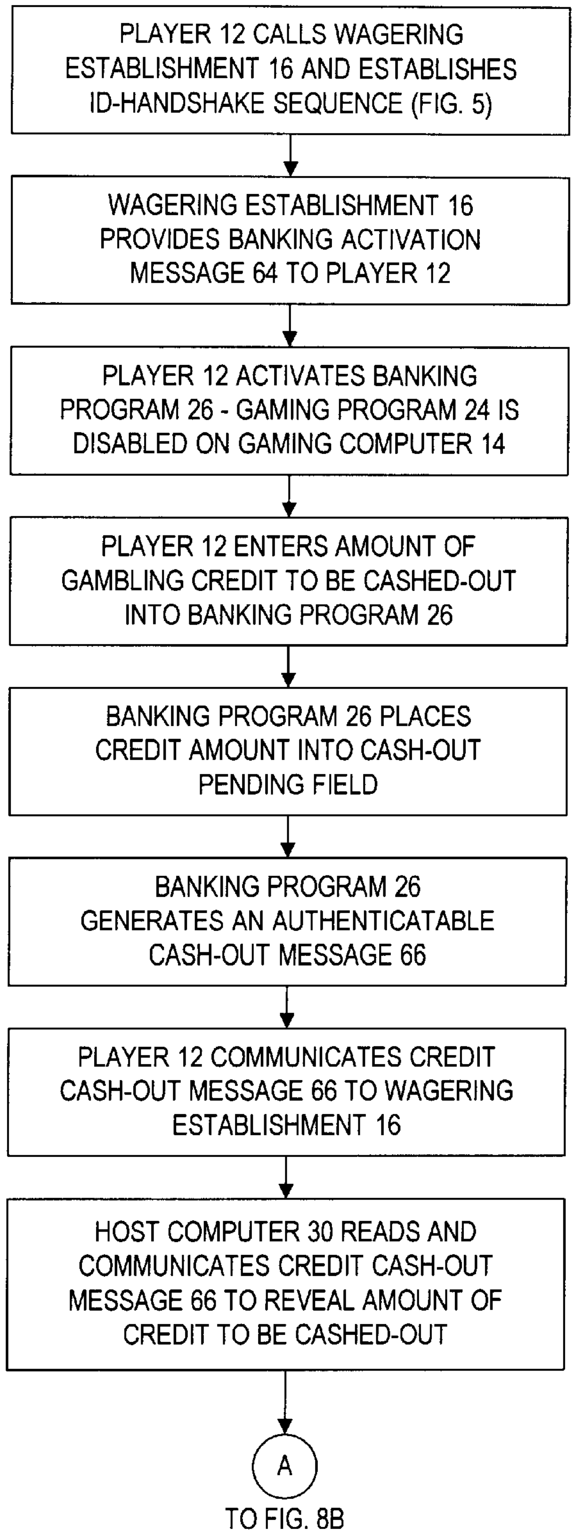
FIGS. 8A–8C are a flowchart of the credit cash-out sequence in the off-line embodiment.
Figure 8B:
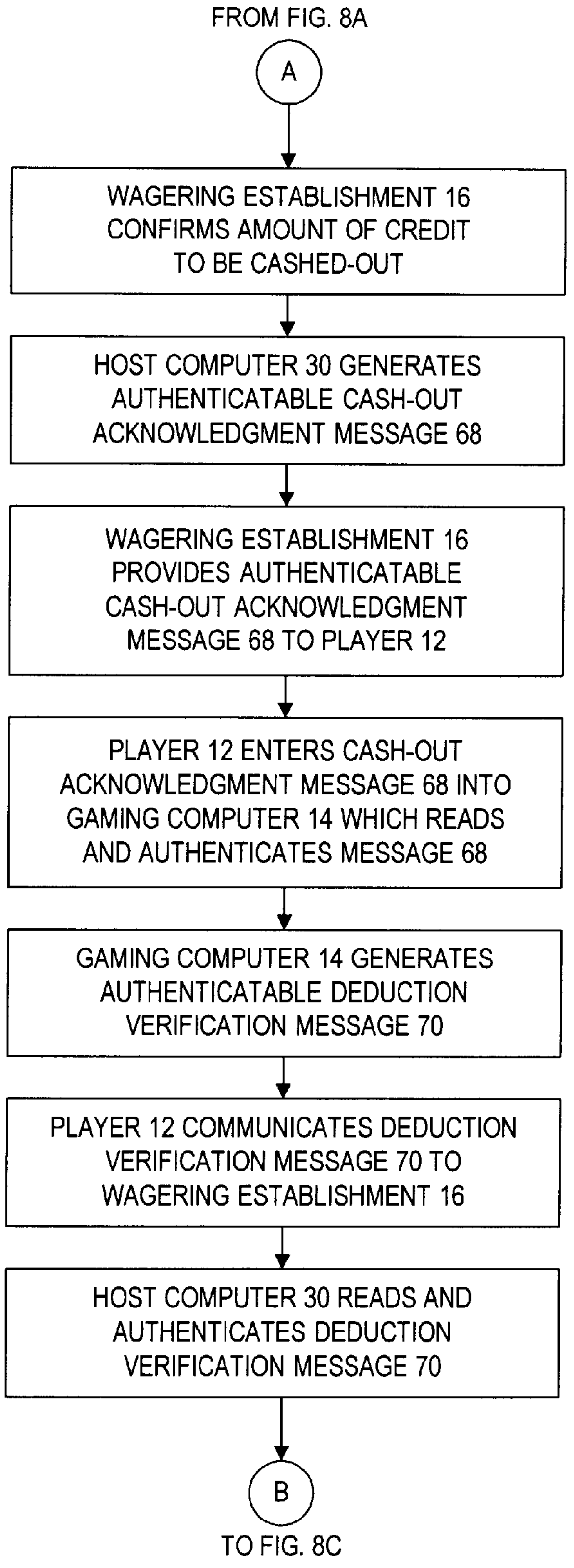
Figure 8C:
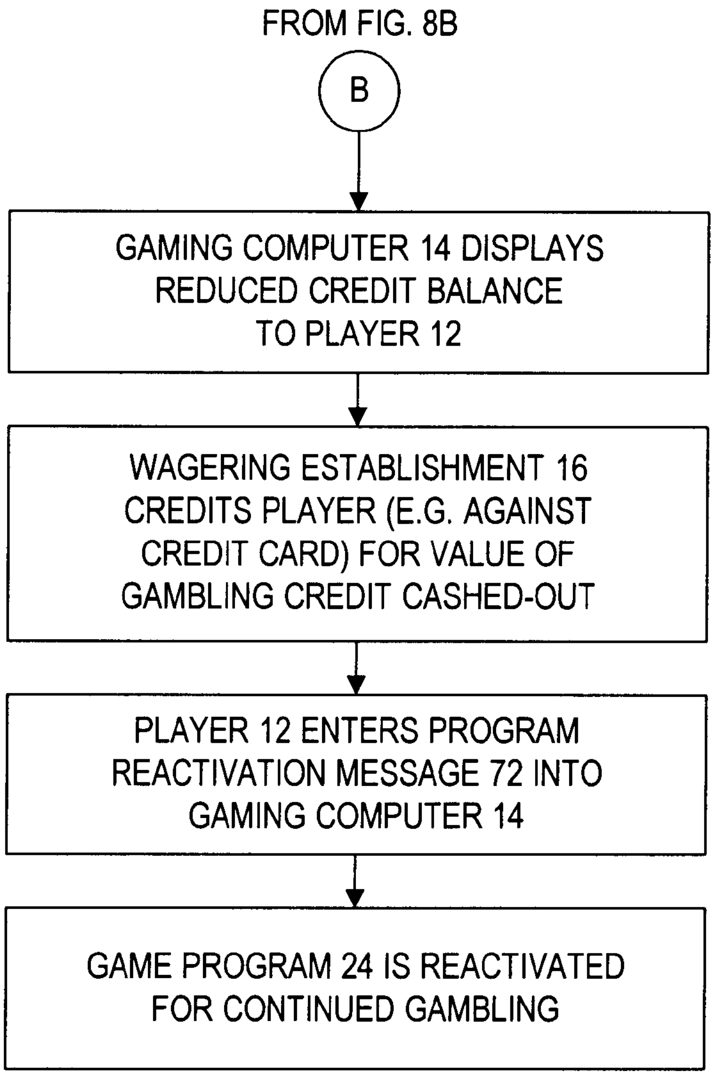

In general, there are several ways by which the player 12 can cash-out winnings when such winnings are embodied or stored in the gaming computer 14. FIGS. 8A–8C are a flowchart diagram of the credit cash-out sequence in a first off-line embodiment. Player 12 first goes through the handshake sequence depicted in FIG. 5 and described above. Once player 12's identity is confirmed, the wagering establishment 16 provides the player 12 with an authenticatable banking activation message 64. The player 12 then activates banking program 26 and enters the banking activation message 64, which is read and authenticated by the gaming computer 14 to access the banking purchasing/redemption function. Player 12 then enters the amount of gambling credit he or she wants to cash-out into banking program 26. The amount to be cashed-out is placed by the banking program 26 into a cash-out pending field. The player's banking program 26 then generates an authenticatable credit cash-out message 66 which the player 12 provides to wagering establishment 16. The host computer 30 reads and authenticates the credit cash-out message 66 to reveal the amount of credit that the player 12 is requesting be cashed out, which amount is confirmed to the player 12 by wagering establishment 16. The host computer 30 then generates an authenticatable cash-out acknowledgment message 68 and provides this message to the player 12. Player 12 enters the cash-out acknowledgment message 68 into gaming computer 14 which reads and authenticates the same, and banking program 26 then deducts the amount of gambling credit to be cashed-out of the player's available gambling credit balance. Banking program 26 then generates an authenticatable deduction verification message 70 which indicates that the correct amount was deducted from the player's account. This message is provided to the wagering establishment 16 and read and authenticated by the host computer 30. The host computer thereafter generates an authenticatable program reactivation message 72 which is provided to the player 12 for entry into the gaming computer 14 to enable the game program 24 to permit continued gambling with any available gambling credit. The wagering establishment 16 then issues payment to the player 12 for the amount of gambling credit cashed-out, in the form of a credit to the player's credit card, a banking wire or some other mutually agreed-upon method of payment. It is also contemplated that where the player 12 has been provided with a dedicated gaming computer 14 (e.g., a hand-held device) gambling credit may be cashed-out by simply bringing the gaming computer 14 to the wagering establishment 16 (or its agent), where either the entire device or a credit module associated therewith is physically returned to facilitate inspection of the apparatus to determine whether any attempts have been made to tamper with or modify the unit or the software.

FIGS. 9A–12 contain flowcharts of an on-line embodiment schematically depicted in FIG. 2, whereby gaming computer 14 communicates directly through a public telephone network or like communications link 40, such as via a modem, with the host computer 30. The host computer 30 includes gaming software 74 comprised of a game program 76, banking program 77, audit program 78 and authenticatable message read, authenticate and generate software 79. To prevent unauthorized access, an external authentication device such as the encryption/decryption device 82 shown schematically in FIG. 2, is used by the player 12 to generate a unique alphanumeric identification message 83 to provide a secure log-on message to obtain access to host computer 30 to participate in on-line gambling and/or purchase and redeem gambling credit. In one embodiment, device 82, which looks like a credit-card calculator, includes a display 84, an integral keyboard 86 and internal encryption/decryption hardware and/or software. Such a device is currently used for making wireless money transfers, for example, by Fleet Bank. Messages input and output to and from device 82 could be embodied in specific sounds identified through a dedicated sound recognition program which are transmitted to and received from computer 30. The encryption/decryption device 82 is used to generate an authenticatable log-on message 83 by encrypting player 12's personal identification message 32 with a separate verification message 88 provided to player 12 by computer 30. Alternatively, verification message 88 can be "built into" encryption/decryption device 82, such as stored in a ROM chip. Thus, knowledge of the player 12's personal identification message 32, in and of itself, is insufficient to enable an unauthorized third party such as a minor or known compulsive gambler to obtain access to gambling or to purchase and/or cash-out gambling credit. The gaming software 33 in the host computer 30 can contain appropriate instructions to, in such a case, terminate the on-line connection and prevent further attempts to gain access with that particular personal identification message 32. Moreover, the device 82 can have the banking program 26 associated therewith in order to store gambling credit independent of the gaming computer 14, in which case the exchange of messages between the device 82 and the gaming computer 14 would represent the actual "money". In this manner, gambling credit can be embodied in an apparatus which is structurally independent from the gaming computer 14.

Figure 9A:
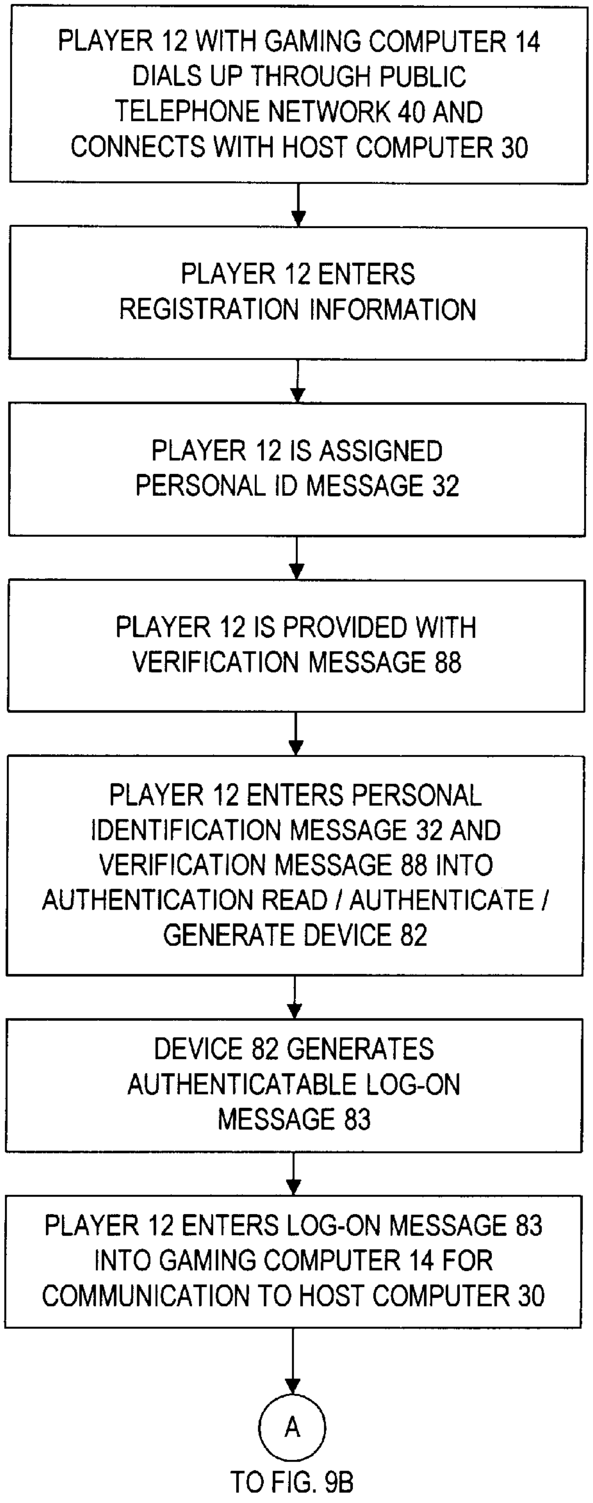
FIGS. 9A–9B are a flowchart of the registration and start-up sequence in the on-line embodiment.
Figure 9B:
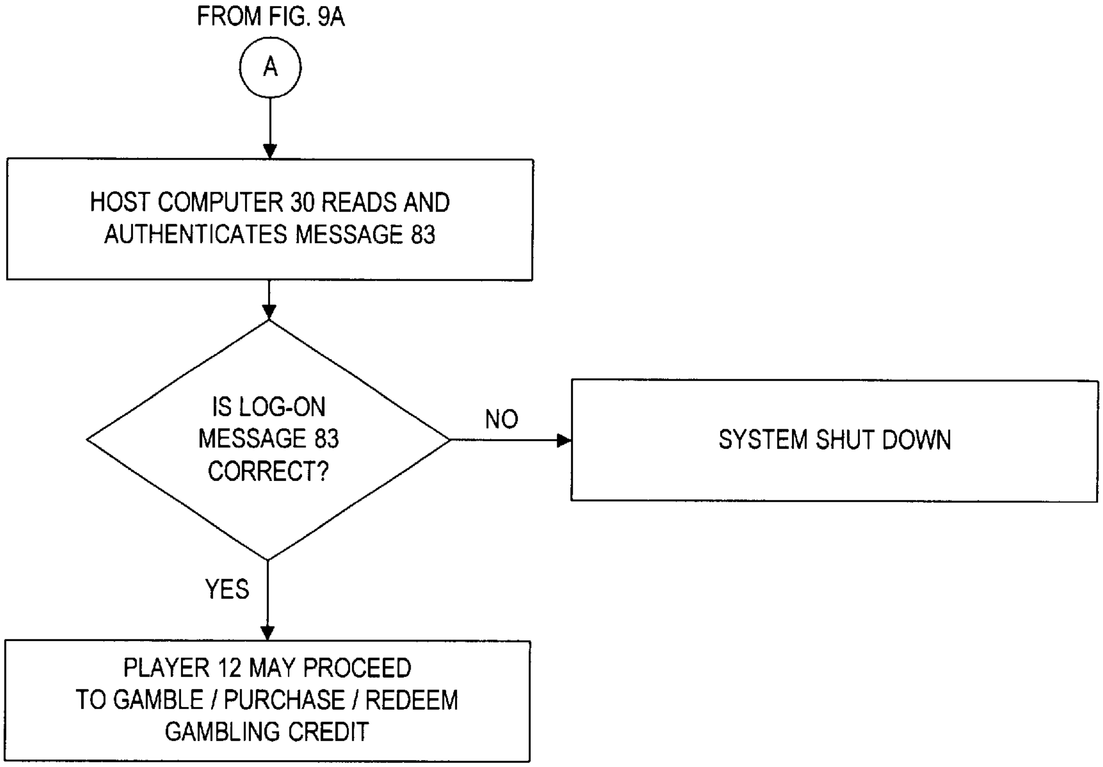

FIGS. 9A–9B are a flowchart of the registration and start-up sequence. Initially, the player 12 through gaming computer 14, dials up and connects through the public telephone network 40 to the host computer 30. Player 12 then enters the requested registration information and is assigned a unique personal identification message 32. The player 12 then logs-on as described above. If player 12's identity is confirmed, the host computer 30 then permits wagering to the extent of any available gambling credit, and credit purchase and/or redemption.

Figure 10:
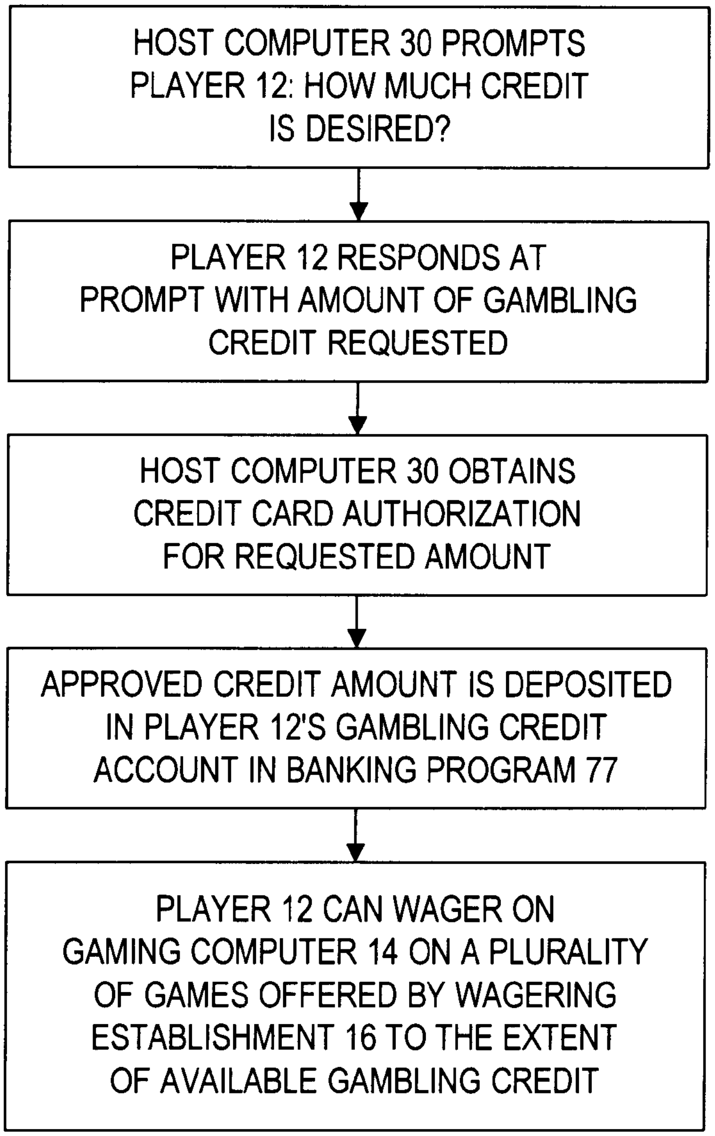
FIG. 10 is the purchase credit sequence in the on-line embodiment.

As shown in FIG. 10, the purchase credit sequence in the on-line embodiment is comprised of the following series of exchanges between the gaming computer 14 and the host computer 30. The host computer 30 first generates a message which queries the player as to how much gambling credit is desired for the particular gambling session. The player 12 responds at the prompt with the amount of wagering credit requested. The wagering establishment 16 then obtains authorization for the requested amount through agreed upon methods of credit such as a credit card or the like. The approved credit amount is then deposited into player 12's wagering credit account in banking program 77. At this point, the player 12 can proceed to wager on a plurality of games offered by the wagering establishment 16. In this connection, player 12 may at the end of each session, request an authenticatable message number that verifies the amount of credit he or she has available from the wagering establishment 16 at that time for purposes of any future dispute resolution.

Figure 11:
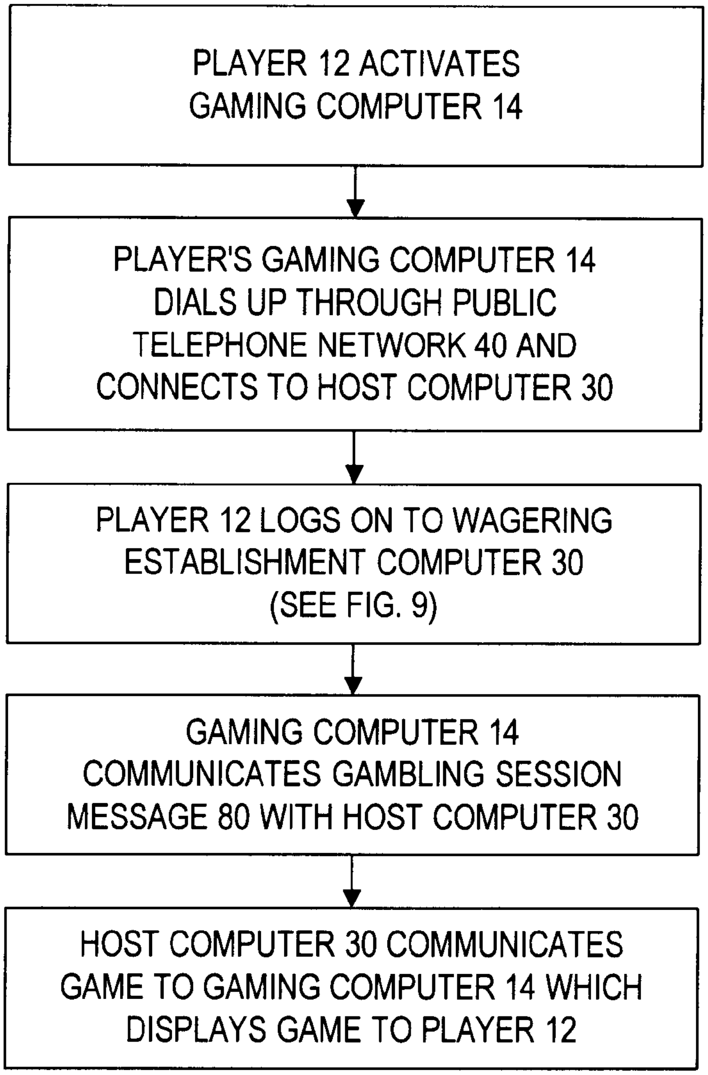
FIG. 11 is a flowchart of the wagering sequence in the on-line embodiment.

FIG. 11 is a flowchart of the gambling sequence in the on-line embodiment. The player 12 first activates gaming computer 14, establishes electronic communications with the wagering establishment computer 30 through the public telephone network 40, and proceeds with the secure log-on procedure described above. The gaming computer 14 then registers a gambling session message 80 with the host computer 30, which, in turn, makes available to the player 12 for wagering a choice of games of chance, skill or future public events where the outcome is uncertain.

Figure 12:
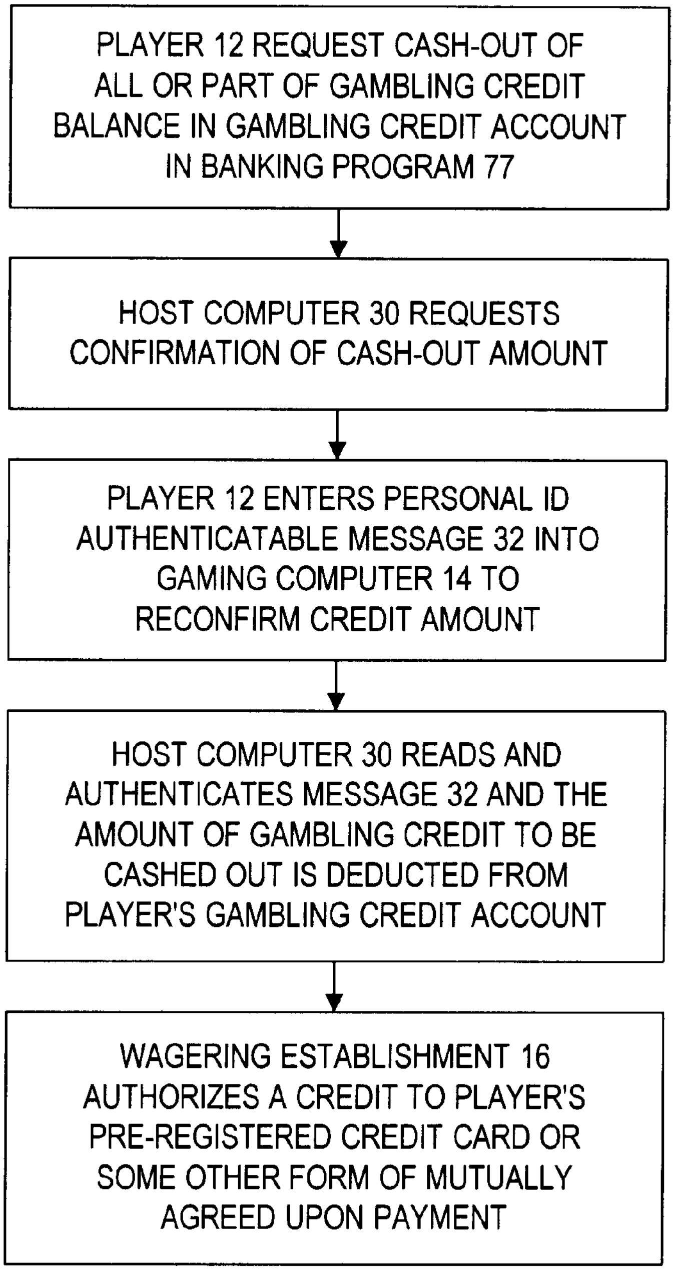
FIG. 12 is a flowchart of the credit cash-out sequence in the on-line embodiment.

FIG. 12 is a flowchart of the credit cash-out sequence in the on-line embodiment. The player 12 first requests to cash-out all or part of the credit balance in the wagering credit account maintained on host computer 30. The wagering establishment 16 then requests confirmation of the amount of credit to be cashed-out. The player 12 then keys in his or her unique personal identification message 32 to reconfirm that amount. This amount is then deducted from the player 12's credit account and the wagering establishment 16 then authorizes a credit to be made to the player's preassigned credit card, or makes some other agreed-upon method of payment. For additional verification, the encryption/decryption device 82 can be used to provide a verification message to the wagering establishment 16 prior to cashing-out. Moreover, the wagering establishment 16 can be provided with a special telephone number to call-back the player 12 to confirm the cash-out which can only then occur when the player 12 calls the wagering establishment 16 back from that number, to provide an additional measure of security.

Alternatively, in another on-line embodiment, the gaming computer 14 includes gaming software 22 as in the first embodiment of FIG. 1A, but is on-line with the host computer 30 and, through the public telephone network 40, the host computer 30 may or may not serve to regulate or control the gaming software simulation of casino games on the gaming computer 14. For example, the host computer 30 can directly keep a record of all or selected activities taking place on the gaming computer 14 for the purpose of additional verification or security. Alternatively, the electronic link can be of a control nature to vary the odds of a given wager based upon any of a variety of factors such as gambling duration or other factors such as a progressively increasing jackpot (e.g., in a slot machine simulation).

In the off-line embodiment, at all times, an audit-trail of all transactions can be recorded on data storage media associated with the host computer 30, and optionally, in gaming computer 14 to be ultimately downloaded to or accessed by the wagering establishment 16. Such an audit-trail can also be recorded in the tamper-resistant or tamper-evident read/write data storage media device 28 provided by the wagering establishment 16 to player 12 in the embodiment shown in FIG. 3.

The present invention has been shown and described in what are considered to be the most practical and preferred embodiments. It is anticipated, however, that departures may be made therefrom and that obvious modifications will occur to persons skilled in the art.

We claim:

1. A gaming system which enables a player at a remote location to purchase and redeem gambling credit for playing games of chance off-line on a remote game computer, comprising:

at least one game computer including associated memory, means for receiving manual input, and processing means for executing at least one program from said associated memory, said at least one program including a game program, said processing means executing said game program to enable the player to play at least one game of chance on said game computer to the extent of available gambling credit in said associated memory while said game computer is not communicating with any other game device during game play except for loading gambling credit into said game computer, said gambling credit being loaded into said game computer by a central host computer using a challenge/response protocol, said game computer further having authentication means operatively associated therewith for generating authenticatable messages, at least one of said processing means, said authentication means and said associated memory being disposed within a secure enclosure; and said central host computer for authorizing game play on at least one remote game computer in the form of gambling credit and providing for verification of winnings after game play, said central host computer having associated memory, processing means for executing at least one program from said central host computer associated memory, and central host computer authentication means operatively associated therewith for generating, receiving, and authenticating authenticatable messages, said authenticatable messages being transmitted between said game computer and said central host computer to verify the integrity and winnings in the form of gambling credit stored in said at least one game computer associated memory, said central host computer loading and verifying authenticatable game data by communicating data through at least one direct electronic connection, said game computer manually receiving input data using said means for receiving manual input to enable said central host computer to authorize game play on said game computer.

2. A method for a player to provide a credit value to a gaming device, comprising:

transmitting to a computer remote from, and not connected to, the gaming device a financial account identifier and a credit request;

receiving by the player from the remote computer an encoded credit value code associated with the credit request, the encoded credit value code being in a human-recognizable format and representing a monetary value;

providing by the player the encoded credit value code to the gaming device via an input means of the gaming device;

responsive to the providing step, adding to the player's available gambling credit balance in the gaming device; and playing the gaming device to generate a game outcome value.

3. The method of claim 2, further comprising:

receiving by the player from the gaming device an encoded current balance code based on the monetary value and the game outcome value.

4. The method of claim 3, further comprising:

transmitting to the remote computer the encoded current balance code to apply the monetary value and the game outcome value to a financial account associated with the financial account identifier.

5. The method of claim 3, wherein the encoded current balance code includes tamper evidence information.

6. The method of claim 3, wherein the encoded current balance code includes audit information.

7. The method of claim 3, wherein the encoded current balance code includes information associated with the gaming device.

8. The method of claim 2, wherein said providing comprises providing the encoded credit value code to a dedicated gaming device.

9. The method of claim 2, wherein said providing comprises providing the encoded credit value code to a personal computer.

10. The method of claim 2, wherein said transmitting comprises:

entering the financial account identifier and the credit request via a numeric keypad of a telephone; and transmitting the financial account identifier and the credit request to the computer remote from the gaming device.

11. A method for a gaming device to receive a credit value from a player, comprising:

receiving from the player an encoded credit value code via an input means of the gaming device, the encoded credit value code being associated with a monetary value and being provided by the player in a human-recognizable format;

decoding the encoded credit value code to determine a current balance based on the monetary value;

enabling the player to play the gaming device; and generating a game outcome value based on the play of the gaming device.

12. The method of claim 11, further comprising: determining a current balance based on the monetary value and the game outcome value.

13. The method of claim 11, further comprising:

encoding the current balance to generate an encoded current balance code; and providing the encoded current balance code to the player.

14. The method of claim 13, wherein said providing comprises displaying the encoded current balance code to the player.

* * * * *

UNITED STATES PATENT AND TRADEMARK OFFICE

CERTIFICATE OF CORRECTION

PATENT NO. : 6,527,638 B1 
DATED : March 4, 2003
INVENTOR(S) : Jay Walker and Bruce Schneier It is certified that error appears in the above-identified patent and that said Letters Patent is hereby corrected as shown below:

Title page,
Item [63], Related U.S. Application Data, should read:
-- Continuation of Application No. 08/406,224 filed on March 16, 1995, now abandoned, which is a continuation-in-part of Application No. 08/269,248, filed on June 30, 1994, now abandoned, which is a continuation-in-part of Application No. 08/212,348, filed on March 11, 1994, now abandoned. --

Signed and Sealed this

Twelfth Day of April, 2005

JON W. DUDAS
*Director of the United States Patent and Trademark Office*